United States Patent
Yashiki et al.

(10) Patent No.: US 10,442,876 B2
(45) Date of Patent: Oct. 15, 2019

(54) BROMINE-CONTAINING POLYMERS AND METHODS FOR PRODUCING THE SAME

(71) Applicant: MANAC INC., Hiroshima (JP)

(72) Inventors: Katsuyori Yashiki, Hiroshima (JP); Atsushi Sudo, Nara (JP)

(73) Assignee: MANAC INC., Hiroshima (JP)

( * ) Notice: Subject to any disclaimer, the term of this patent is extended or adjusted under 35 U.S.C. 154(b) by 8 days.

(21) Appl. No.: 15/538,770

(22) PCT Filed: Sep. 11, 2015

(86) PCT No.: PCT/JP2015/075862
§ 371 (c)(1),
(2) Date: Jun. 22, 2017

(87) PCT Pub. No.: WO2016/103802
PCT Pub. Date: Jun. 30, 2016

(65) Prior Publication Data
US 2017/0349679 A1  Dec. 7, 2017

(30) Foreign Application Priority Data
Dec. 24, 2014  (JP) .................. 2014-260878

(51) Int. Cl.
| | |
|---|---|
| C08F 22/38 | (2006.01) |
| C08F 26/10 | (2006.01) |
| C08F 20/22 | (2006.01) |
| C08F 20/14 | (2006.01) |
| C08F 12/08 | (2006.01) |
| C09K 21/14 | (2006.01) |
| G02B 1/04 | (2006.01) |

(52) U.S. Cl.
CPC ............ *C08F 22/385* (2013.01); *C08F 12/08* (2013.01); *C08F 20/14* (2013.01); *C08F 20/22* (2013.01); *C08F 26/10* (2013.01); *C09K 21/14* (2013.01); *G02B 1/04* (2013.01)

(58) Field of Classification Search
CPC ........ C08F 22/385; C08F 12/08; C08F 20/22; C08F 20/14; C08F 26/10; G02B 1/04; C09K 21/14
See application file for complete search history.

(56) References Cited

U.S. PATENT DOCUMENTS

| | | | | |
|---|---|---|---|---|
| 4,571,418 A | * | 2/1986 | Younes | C08L 67/02 260/DIG. 24 |
| 4,604,422 A | * | 8/1986 | Younes | C08L 69/00 524/502 |
| 4,855,215 A | * | 8/1989 | Nakano | C08F 2/50 430/283.1 |
| 5,037,894 A | * | 8/1991 | MacLeay | C08F 8/30 525/327.6 |
| 5,132,430 A | * | 7/1992 | Gaudiana | C07D 209/88 548/444 |

FOREIGN PATENT DOCUMENTS

| | | |
|---|---|---|
| EP | 0548839 A1 | 6/1993 |
| JP | S60-217217 A | 10/1985 |
| JP | S63-097601 A | 4/1988 |
| JP | H02218759 A | 8/1990 |
| JP | H05262952 A | 10/1993 |
| WO | WO2015/076296 A1 | 3/2017 |

OTHER PUBLICATIONS

International Search Report issued in corresponding application No. PCT/JP2015/075862 dated Dec. 22, 2015 (4 pages).
Written Opinion of the International Searching Authority issued in corresponding application No. PCT/JP2015/075862 dated Dec. 22, 2015 (5 pages).
S.A. Stone-Elander et al., "Conformational Effects on the Cyclopolymerization of N-(p-Bromophenyl) dimethacrylamide"; Macromolecules; vol. 15, No. 1, pp. 45-54; Feb. 1982 (10 pages).

(Continued)

*Primary Examiner* — Robert D Harlan
(74) *Attorney, Agent, or Firm* — Osha Liang LLP

(57) ABSTRACT

The invention provides novel bromine-containing polymers which have excellent heat resistance and are capable of imparting flame retardance or novel flame-retardant, bromine-containing polymers which have excellent heat resistance and optical characteristics, and methods for producing such polymers. The invention relates to a polymer which includes structural units of the following general formula (1):

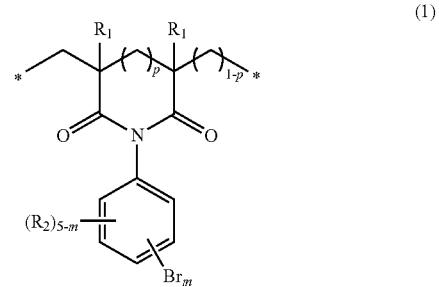

wherein $R_1$s, $R_2$s, m, p and the asterisks are as defined in the specification and the claims, and
to a method for producing such polymers.

12 Claims, 33 Drawing Sheets

(56) References Cited

OTHER PUBLICATIONS

Jin Nishizawa, R&D Support Center Co., Ltd., "The latest technology of flame retardancy and selection and usage of flame retardant"; pp. 67-69; Aug. 1, 2013 (5 pages).
Extended European Search Report issued in corresponding European Application No. 15872371.8 dated Jun. 15, 2018 (6 pages).
Database WPI, Week 199036, Thomson Scientific, London, GB; AN 1990-270663, XP002781658, & JP H02 189316; A (Hitachi Chem Co Ltd) Jul. 25, 1990 (Jul. 25, 1990) (2 pages).

* cited by examiner

BROMINE-CONTAINING POLYMERS AND METHODS FOR PRODUCING THE SAME

TECHNICAL FIELD

The present invention relates to novel bromine-containing polymers and methods for producing such polymers.

BACKGROUND ART

Bromine-containing polymers that contain bromine atoms in the molecule are used as, for example, resin additives which impart flame retardance. It is also known that bromine-containing polymers themselves are useful as resin materials excellent in flame retardance and optical characteristics (in particular, having a high refractive index).

Some examples of bromine-containing polymers are brominated polystyrenes, brominated polyphenylene ethers, brominated benzyl acrylate polymers, brominated polycarbonate oligomers and brominated epoxies. They are mainly used as brominated flame retardants (see, for example, Non Patent Document 1).

Further, polyacrylates having a brominated carbazol in a side chain, and polyacrylates obtained using a bromine-containing monomer as a comonomer have been reported as materials having flame retardance and excellent optical characteristics (in particular, a high refractive index) (see, for example, Patent Documents 1 and 2).

On the other hand, the heat resistance required of resin materials has become of higher level because of the recent increased variety of applications in which the resin materials are used. Various studies are thus being carried out in order to enhance the heat resistance of resins and to enhance the heat resistance of resin additives.

PRIOR ART DOCUMENTS

Patent Documents

Patent Document 1: Japanese Patent Application Kokai Publication No. H5-262952
Patent Document 2: U.S. Pat. No. 5,132,430

Non-Patent Documents

Non-Patent Document 1: supervised by Hitoshi Nishizawa, "Nan-nenka no saishin gijutsu to nan-nenzai no sentei•shiyou hou (New technology of flame retardation and selection/use of flame retardants), R & D Support Center Co., Ltd., Aug. 1, 2013, pp. 67-69

SUMMARY OF THE INVENTION

Problems to be Solved by the Invention

The present invention provides novel bromine-containing polymers which have excellent heat resistance and are capable of imparting flame retardance or novel flame-retardant, bromine-containing polymers which have excellent heat resistance and optical characteristics, and methods for producing such polymers.

Means to Solve the Problems

The present inventors carried out extensive studies to attain the above object and have completed the present invention as a result. Specifically, the present invention pertains to a polymer including structural units of the following general formula (1):

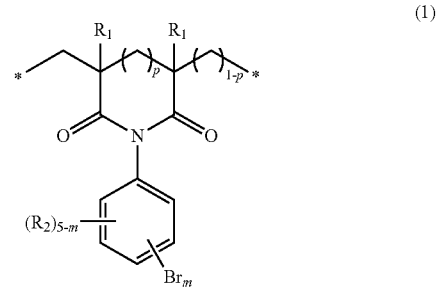

wherein
p is 0 or 1,
m is an integer of 2 to 5,
$R_1$s may be the same as or different from one another and represent at each occurrence a hydrogen atom or an alkyl group having 1 to 4 carbon atoms,
$R_2$ is a hydrogen atom, a fluorine atom, a chlorine atom, an iodine atom, an alkyl group having 1 to 4 carbon atoms, an alkoxy group having 1 to 4 carbon atoms, an alkylthio group having 1 to 4 carbon atoms, a haloalkyl group having 1 to 4 carbon atoms, a haloalkoxy group having 1 to 4 carbon atoms, a vinyl group, a nitro group, a cyano group, a formyl group, an amino group, a hydroxyl group, a thiol group, a sulfo group, a sulfonamide group, a carboxyl group or an ester group, and when m is 2 or 3, $R_2$s may be the same as or different from one another, and
the asterisks indicate a polymer end or a bond to other structural unit. The invention also pertains to a method for producing such polymers, and to a flame retardant including such a polymer.

Effects of the Invention

The bromine-containing polymers provided according to the present invention contain bromine atoms in the monomer units and have ring structures in the main chain, and are useful as flame retardants or flame-retardant resins having outstanding heat resistance. Further, the polymers of the invention, by virtue of their containing bromine atoms, can be expected to be used also as flame-retardant resin materials having excellent optical characteristics (in particular, a high refractive index).

EMBODIMENTS TO CARRY OUT THE INVENTION

Figure 1A:
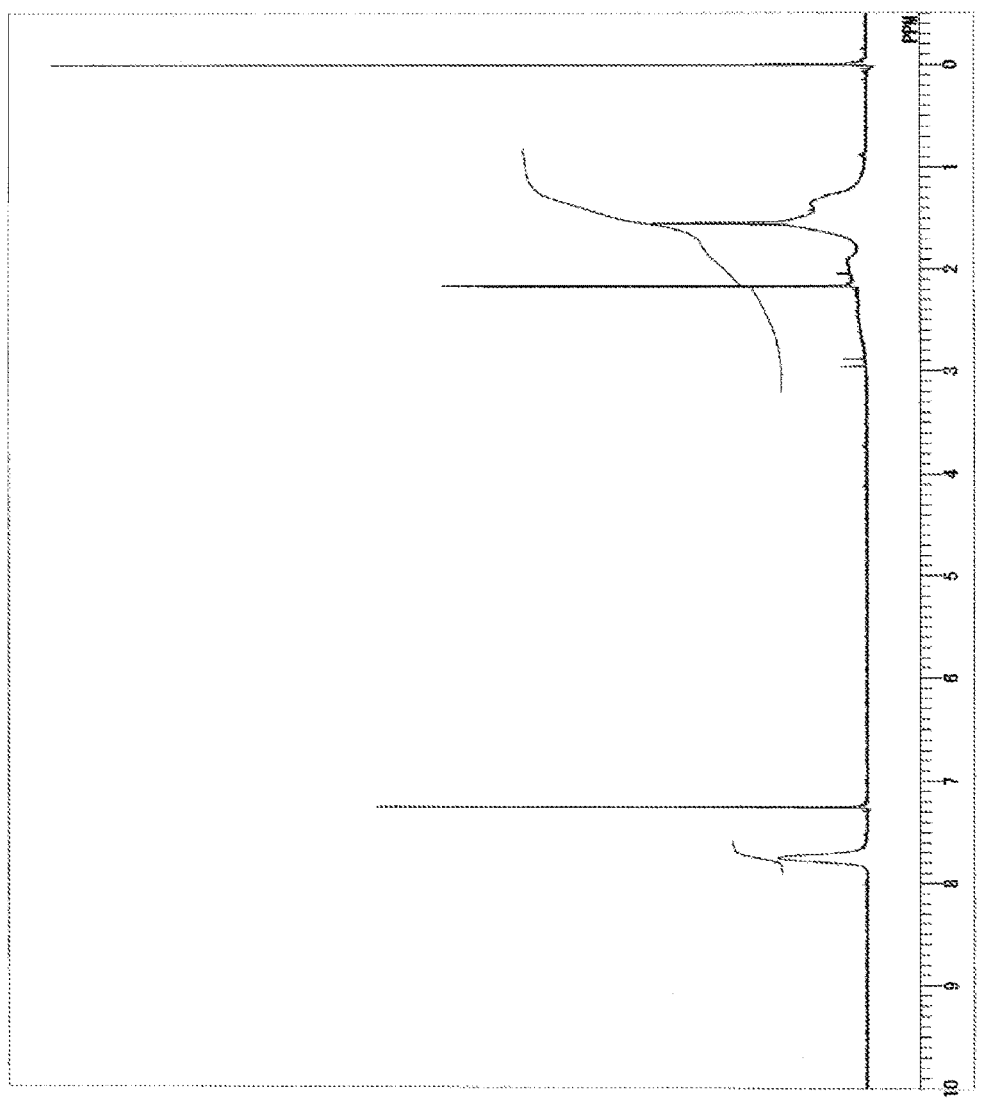
FIG. 1A is a $^1$H-NMR chart of a compound obtained in Example 1.

Embodiments of the present invention will be described in detail hereinbelow.

An aspect of the present invention resides in a polymer which includes structural units of the following general formula (1):

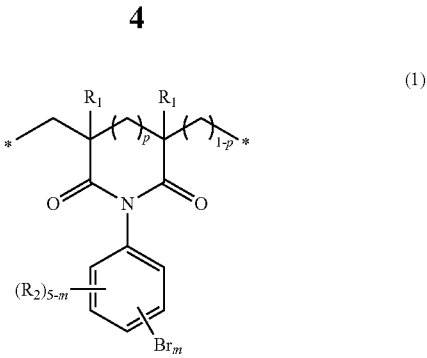

wherein p is 0 or 1, m is an integer of 2 to 5, $R_1$s may be the same as or different from one another and represent at each occurrence a hydrogen atom or an alkyl group having 1 to 4 carbon atoms, $R_2$ is a hydrogen atom, a fluorine atom, a chlorine atom, an iodine atom, an alkyl group having 1 to 4 carbon atoms, an alkoxy group having 1 to 4 carbon atoms, an alkylthio group having 1 to 4 carbon atoms, a haloalkyl group having 1 to 4 carbon atoms, a haloalkoxy group having 1 to 4 carbon atoms, a vinyl group, a nitro group, a cyano group, a formyl group, an amino group, a hydroxyl group, a thiol group, a sulfo group, a sulfonamide group, a carboxyl group or an ester group, and when m is 2 or 3, $R_2$s may be the same as or different from one another, and the asterisks indicate a polymer end or a bond to other structural unit.

Here, the term "alkyl group having 1 to 4 carbon atoms" means a linear or branched, monovalent aliphatic saturated hydrocarbon group having 1 to 4 carbon atoms, with examples including methyl group, ethyl group, propyl group, isopropyl group, butyl group, isobutyl group, s-butyl group and t-butyl group.

The term "haloalkyl group having 1 to 4 carbon atoms" means the alkyl group having 1 to 4 carbon atoms that is substituted by one or more halogen atoms, with examples including bromomethyl group, 2-bromoethyl group, 3-bromopropyl group, 4-bromobutyl group, iodomethyl group, 2-iodoethyl group, 3-iodopropyl group, 4-iodobutyl group, fluoromethyl group, 2-fluoroethyl group, 3-fluoropropyl group, 4-fluorobutyl group, tribromomethyl group, trichloromethyl group and trifluoromethyl group. When the alkyl group having 1 to 4 carbon atoms is substituted by two or more halogen atoms, the halogen atoms may be the same as or different from one another.

The term "alkoxy group having 1 to 4 carbon atoms" means a group RO— (wherein R is an alkyl group having 1 to 4 carbon atoms), with examples including methoxy group, ethoxy group, propoxy group, isopropoxy group, butoxy group, isobutoxy group, s-butoxy group and t-butoxy group.

The term "haloalkoxy group having 1 to 4 carbon atoms" means the alkoxy group having 1 to 4 carbon atoms that is substituted by one or more halogen atoms, with examples including bromomethoxy group, 2-bromoethoxy group, 3-bromopropyloxy group, 4-bromobutyloxy group, iodomethoxy group, 2-iodoethoxy group, 3-iodopropyloxy group, 4-iodobutyloxy group, fluoromethoxy group, 2-fluoroethoxy group, 3-fluoropropyloxy group, 4-fluorobutyloxy group, tribromomethoxy group, trichloromethoxy group and trifluoromethoxy group. When the alkoxy group having 1 to 4 carbon atoms is substituted by two or more halogen atoms, the halogen atoms may be the same as or different from one another.

The term "alkylthio group having 1 to 4 carbon atoms" means a group R'S— (wherein R' is an alkyl group having 1 to 4 carbon atoms), with examples including methylthio group, ethylthio group, propylthio group, isopropylthio group, butylthio group, isobutylthio group, s-butylthio group and t-butylthio group.

The terms "halogen atom" and "halo" are interchangeable and mean an iodine atom, a bromine atom, a chlorine atom or a fluorine atom.

The term "carboxyl group or ester group" means a group: —COOH or an ester group thereof (that is, a group: —COOR"). Here, R" is an alkyl group having 1 to 4 carbon atoms.

In the general formula (1), $R_1$s may be each any of a hydrogen atom and an alkyl group having 1 to 4 carbon atoms. $R_1$s in the structural unit may be the same as or different from one another and may include both a hydrogen atom and an alkyl group having 1 to 4 carbon atoms. Because the bromine content can be increased and the polymer can be obtained easily, hydrogen atoms or methyl groups are preferable.

$R_2$s in the general formula (1) may be selected appropriately in accordance with the availability of raw materials and the easiness of synthesis. Because the bromine content can be increased, it is preferable that one or more hydrogen atoms are present, and it is more preferable that $R_2$s be all hydrogen atoms.

When p in the general formula (1) is 1, the imide moiety is a six-membered ring structure. Specifically, it is represented by the following general formula (2):

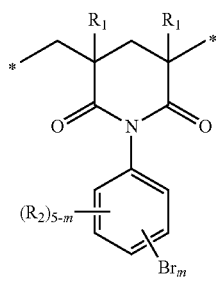

(2)

wherein $R_1$s, $R_2$s, m and the asterisks are the same as defined above.

When p is 0, the imide moiety is a five-membered ring structure. Specifically, it is represented by the following general formula (3):

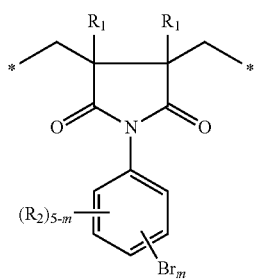

(3)

wherein $R_1$s, $R_2$s, m and the asterisks are the same as defined above.

The structural units of the general formula (1) that are present in the polymer of the invention may be one of the general formula (2) and the general formula (3). The polymer may include two or more kinds of structural units represented by either one of these formulas. The polymer may include both structural units of the general formulas (2) and (3).

In the general formula (1), the letter m indicating the number of the substitution by bromine atoms is 2 to 5 and, from the point of view of bromine content, is preferably 3 to 5. The positions of the substitution by bromine atoms are not particularly limited, and the polymer may include isomers, which differ in the number and positions of the substitution by bromine atoms, as the structural units.

From the point of view of flame retardance, the bromine content in the inventive polymer is preferably 10 to 75 wt %, more preferably 30 to 75 wt %, and even more preferably 50 to 75 wt % relative to the total weight of the polymer. In the invention, the bromine content is a value measured by a method in accordance with JIS K 7229 (flask combustion method). In the case where the polymer contains halogen atoms other than bromine atoms, the value that is measured may be corrected using an appropriate method such as chromatography.

The polymer of the invention is not particularly limited as long as it has structural units of the general formula (1), and may appropriately include comonomer components other than the structural units of the general formula (1) in accordance with purpose and use application. From the point of view of copolymerizability, preferred comonomer components are those structural units other than the general formula (1) which contain a vinyl group in the structure.

Some examples of vinyl-containing monomers that do not belong to the structural units of the general formula (1) include vinyl compounds, vinylidene compounds, vinylene compounds, cycloolefin compounds, conjugated diene compounds, and macro compounds having a vinyl group at an end of the polymer molecular chain. These monomers may be used alone, or two or more kinds thereof may be used in combination.

Examples of the vinyl compounds include, but are not limited to, ethylene, propylene, styrene, brominated styrene, chlorinated styrene, methoxystyrene, vinylbenzyl methyl ether, vinyltoluene, vinyl chloride, vinyl bromide, vinyl fluoride, vinyl acetate, vinyl propionate, vinyl butyrate, vinyl benzoate, vinyl methyl ether, vinyl ethyl ether, allyl glycidyl ether, acrylic acid, methyl acrylate, ethyl acrylate, n-propyl acrylate, i-propyl acrylate, n-butyl acrylate, i-butyl acrylate, s-butyl acrylate, t-butyl acrylate, 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 2-hydroxy-3-phenoxypropyl acrylate, brominated 2-hydroxy-3-phenoxypropyl acrylate, allyl acrylate, 2,3-dibromopropyl acrylate, tribromoneopentyl acrylate, benzyl acrylate, brominated benzyl acrylate, cyclohexyl acrylate, phenyl acrylate, brominated phenyl acrylate, 2-methoxyethyl acrylate, 2-phenoxyethyl acrylate, brominated 2-phenoxyethyl acrylate, methoxydiethylene glycol acrylate, methoxytriethylene glycol acrylate, methoxypropylene glycol acrylate, methoxydipropylene glycol acrylate, isobornyl acrylate, dicyclopentadienyl acrylate, glycerol monoacrylate, glycidyl acrylate, 2-aminoethyl acrylate, 2-dimethylaminoethyl acrylate, 2-aminopropyl acrylate, 2-dimethylaminopropyl acrylate, 3-aminopropyl acrylate, 3-dimethylaminopropyl acrylate, acrylamide, N-2-hydroxyethylacrylamide, N-isopropylacrylamide, N-phenylacrylamide, brominated N-phenylacrylamide, 1-vinyl-2-pyrrolidone, acrylonitrile, diallyl ether, phenyl allyl ether, brominated phenyl allyl ether and allylamine.

Examples of the vinylidene compounds include, but are not limited to, vinylidene chloride, vinylidene fluoride, α-methylstyrene, methacrylic acid, methyl methacrylate, ethyl methacrylate, n-propyl methacrylate, i-propyl methacrylate, n-butyl methacrylate, i-butyl methacrylate, s-butyl methacrylate, t-butyl methacrylate, 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, 2-hydroxy-3-phenoxypropyl methacrylate, brominated 2-hydroxy-3-phenoxypropyl methacrylate, allyl methacrylate, 2,3-dibromopropyl methacrylate, tribromoneopentyl methacrylate, benzyl methacrylate, brominated benzyl methacrylate, cyclohexyl methacrylate, phenyl methacrylate, brominated phenyl methacrylate, 2-methoxyethyl methacrylate, 2-phenoxyethyl methacrylate, brominated 2-phenoxyethyl methacrylate, methoxydiethylene glycol methacrylate, methoxytriethylene glycol methacrylate, methoxypropylene glycol methacrylate, methoxydipropylene glycol methacrylate, isobornyl methacrylate, dicyclopentadienyl methacrylate, glycerol monomethacrylate, glycidyl methacrylate, 2-aminoethyl methacrylate, 2-dimethylaminoethyl methacrylate, 2-aminopropyl methacrylate, 2-dimethylaminopropyl methacrylate, 3-aminopropyl methacrylate, 3-dimethylaminopropyl methacrylate, methacrylamide, N-2-hydroxyethylmethacrylamide, N-isopropylmethacrylamide, N-phenylmethacrylamide, brominated N-phenylmethacrylamide, α-chloroacrylamide, methacrylonitrile, α-chloroacrylonitrile and vinylidene cyanide.

Examples of the vinylene compounds include, but are not limited to, dialkyl fumarate, maleimide, N-phenylmaleimide, brominated N-phenylmaleimide, N-cyclohexylmaleimide and vinylene carbonate.

Examples of the cycloolefin compounds include, but are not limited to, norbornene, cyclobutene, cyclopentene, cyclohexene, indene, brominated indene, 1-methylindene, brominated 1-methylindene, phenanthrene and brominated phenanthrene.

Examples of the conjugated diene compounds include, but are not limited to, 1,3-butadiene, isoprene, chloroprene and 2,3-dichloro-1,3-butadiene.

Examples of the polymer molecular chains in the macro compounds having a vinyl group at an end of the polymer molecular chain include, but are not limited to, polystyrene, polymethyl (meth)acrylate, poly-n-butyl (meth)acrylate and polysiloxane.

Both ends of the polymer having the structural units of the general formula (1) may be, for example, initiator residues derived from a polymerization initiator described later, or hydrogen atoms.

From the points of view of flame retardance and heat resistance, the polymer of the invention preferably contains the structural units of the general formula (1) in an amount of not less than 30 mol %, more preferably not less than 50 mol %, and even more preferably not less than 80 mol %. Most preferably, the polymer of the invention consists solely of the structural units of the general formula (1).

The molecular weight of the polymer of the invention may be selected appropriately in accordance with purpose and use application. To attain good thermal stability and workability, the weight-average molecular weight in terms of polystyrenes is preferably 1,000 to 1,000,000, more preferably 1,000 to 500,000, and even more preferably 1,000 to 250,000.

When, for example, the polymer of the invention is used as a flame retardant, the 5% weight loss temperature measured by thermogravimetric analysis (TGA) is preferably 200 to 450° C., and more preferably 250 to 450° C. to meet the stability that is required at working temperatures.

The term flame retardants used in the invention means agents used to impart flame retardance to combustible materials such as plastics, rubbers, fibers, paper and wood. The term also comprehends materials that can be used as flame-retardant materials themselves such as the polymers of the present invention.

The term flame-retardant optical materials used in the invention means flame-retardant materials used in applications in which lights such as visible lights, infrared lights, UV lights, X rays and laser beams are passed through the materials. Examples of the applications of such flame-retardant optical materials include optical lenses, optical films, optical adhesives, optical substrates, optical filters, optical disks and optical fibers.

The polymers of the invention may be produced by any methods without limitation. Preferably, a monomer of the following general formula (4):

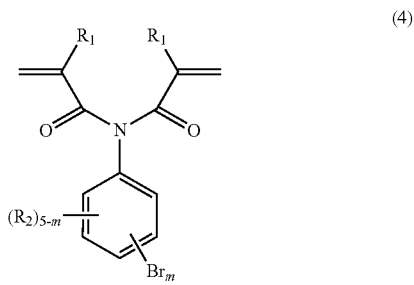

wherein m is an integer of 2 to 5, $R_1$s may be the same as or different from one another and represent at each occurrence a hydrogen atom or an alkyl group having 1 to 4 carbon atoms, $R_2$ is a hydrogen atom, a fluorine atom, a chlorine atom, an iodine atom, an alkyl group having 1 to 4 carbon atoms, an alkoxy group having 1 to 4 carbon atoms, an alkylthio group having 1 to 4 carbon atoms, a haloalkyl group having 1 to 4 carbon atoms, a haloalkoxy group having 1 to 4 carbon atoms, a vinyl group, a nitro group, a cyano group, a formyl group, an amino group, a hydroxyl group, a thiol group, a sulfo group, a sulfonamide group, a carboxyl group or an ester group, and, when m is 2 or 3, $R_2$s may be the same as or different from one another, may be polymerized to give a polymer having structural units of the following general formula (1):

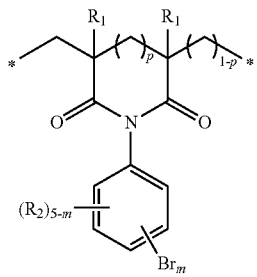

wherein $R_1$s, $R_2$s, m, p and the asterisks are the same as defined above.

The monomer of the general formula (4), which may be used in the production method of the invention, may be prepared by any production process. For example, such a monomer may be synthesized using an aniline derivative and an acrylic acid halide derivative in accordance with a known method (for example, the method described in European Patent Application No. 1956033). Preferably, an aniline derivative of the following general formula (5):

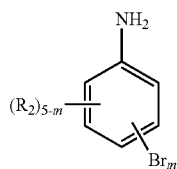

wherein, m and $R_2$s are the same as defined above,
may be reacted, in the presence of a base, with an acrylic acid halide derivative of the general formula (6):

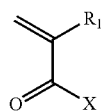

wherein
$R_1$ is a hydrogen atom or an alkyl group having 1 to 4 carbon atoms, and
X is a chlorine atom or a bromine atom,
to give a bromine-containing N-phenyldiacrylamide derivative of the general formula (4) described hereinabove.

The aniline derivatives of the general formula (5) are sold in the market and are easily available from suppliers such as MANAC INC. and Sigma-Aldrich Japan. Examples thereof include 2,4-, 2,5-, 2,6- or 3,4-dibromoaniline, 2,6-dibromo-4-methylaniline, 4-chloro-2,4-dibromoaniline, 2,6-dibromo-4-trifluoromethylaniline, 2,6-dibromo-4-trifluoromethoxyaniline, 2,6-dibromo-4-nitroaniline, 2,4,6-tribromoaniline and 3-methyl-2,4,6-tribromoaniline. Alternatively, such derivatives may be synthesized in accordance with known methods (for example, the method described in Organic Syntheses, Vol. 13, p. 93 (1933)).

The acrylic acid halide derivatives of the general formula (6) are sold in the market and are easily available from suppliers such as Tokyo Chemical Industry Co., Ltd. Examples thereof include acrylic acid chloride, methacrylic acid chloride and 2-ethylacrylic acid chloride. Alternatively, such derivatives may be synthesized by subjecting acrylic acid derivatives to known acid halide reaction.

Further, the acrylic acid halide derivative of the general formula (6) may be a hydrogen halide adduct which can form an acrylic acid halide derivative in the presence of a base. Examples thereof include 3-chloropropionyl chloride and 3-bromopropionyl chloride.

The acrylic acid halide derivative of the general formula (6) is used in an amount of 1.0 to 10 mol, preferably 1.5 to 8 mol, and more preferably 2.0 to 5.0 mol per 1 mol of the aniline derivative of the general formula (5).

The base used in the synthesis of the monomer of the general formula (4) may be any of inorganic bases, organic bases and metal alkoxides. These bases may be used alone, or two or more kinds thereof may be used in combination. The inorganic bases are not particularly limited, and examples thereof include ammonia, lithium hydroxide, sodium hydroxide, potassium hydroxide, lithium hydride, sodium hydride, potassium hydride, lithium carbonate, sodium carbonate, potassium carbonate, cesium carbonate, sodium hydrogen carbonate, potassium hydrogen carbonate, cesium hydrogen carbonate, disodium hydrogen phosphate, sodium dihydrogen phosphate, dipotassium hydrogen phosphate, potassium dihydrogen phosphate, metallic lithium, metallic sodium and metallic potassium. The organic bases are not particularly limited, and examples thereof include pyridine, 4-dimethylaminopyridine (DMAP), lutidine, collidine, trimethylamine, dimethylamine, triethylamine, diethylamine, N,N-diisopropylethylamine, N,N-diisopropylpentylamine, morpholine, piperidine, pyrrolidine, 1,8-diazabicyclo[5.4.0]undec-7-ene (DBU), 1,5-diazabicyclo[4.3.0]non-5-ene (DBN) and 1,4-diazabicyclo[2.2.2]octane (DABCO). The metal alkoxides are not particularly limited, and examples thereof include sodium methoxide, potassium methoxide, sodium ethoxide, potassium ethoxide, sodium t-butoxide and potassium t-butoxide. In particular, organic bases are preferable, and pyridine, 4-dimethylaminopyridine (DMAP) and triethylamine are more preferable. The amount of the base used is 0.5 to 20 mol, preferably 0.5 to 15 mol, and more preferably 0.8 to 10 mol per 1 mol of the aniline derivative of the general formula (5).

The aniline derivative of the general formula (5), the acrylic acid halide derivative of the general formula (6) and the base may be added in any order without limitation. The reaction may be started by adding and mixing these three at the same time, or the reaction may be started and allowed to take place while mixing any two kinds of the compounds together and thereafter adding the remaining one kind of the compound at once or in portions.

The monomer of the general formula (4) may be synthesized without solvents or in the presence of a solvent. The solvent that is used is not particularly limited as long as it is inactive in the reaction, and may be selected appropriately in accordance with the desired conditions such as reaction temperature. Specific examples include aromatic hydrocarbon solvents such as benzene, toluene, xylene, mesitylene, monochlorobenzene, monobromobenzene, dichlorobenzene and trichlorobenzene; aliphatic hydrocarbon solvents such as n-hexane, n-heptane, n-octane, cyclopentane, cyclohexane, dichloromethane, dibromomethane, chloroform, carbon tetrachloride, ethylene dichloride, 1,1,1-trichloroethane and trichloroethylene; ether solvents such as diethyl ether, 1,2-dimethoxyethane, tetrahydrofuran, 1,4-dioxane and cyclopentyl methyl ether; ester solvents such as methyl acetate, ethyl acetate, butyl acetate, ethyl propionate, γ-butyrolactone and γ-valerolactone; ketone solvents such as acetone, methyl ethyl ketone, methyl isobutyl ketone, cyclopentanone and cyclohexanone; sulfur-containing solvents such as dimethylsulfoxide; nitrogen-containing solvents such as picoline and pyridine; and nitrile solvents such as acetonitrile and benzonitrile. These may be used alone, or two or more kinds thereof may be used in combination. Of the solvents, toluene, xylene, monochlorobenzene, dichloromethane, tetrahydrofuran, cyclopentyl methyl ether, acetone, methyl ethyl ketone, methyl isobutyl ketone, dimethylsulfoxide and acetonitrile are preferable in view of solubility of the raw materials, little impact on the human body and the environment, and high availability in industry. The amount of the solvent is preferably 0 to 20 times (by weight), and more preferably 0 to 10 times (by weight) per 1 g of the compound of the general formula (5).

The reaction temperature is preferably in the range of 0 to 200° C. To suppress side reactions, the reaction temperature is more preferably in the range of 0 to 150° C. The reaction time may be selected appropriately in accordance with conditions such as the amounts and types of the starting substances used, the presence or absence and the type of a solvent, and the reaction temperature. Usually, the reaction time is preferably 1 minute to 336 hours, and, from the point of view of workability, more preferably 10 minutes to 168 hours.

The polymerization method of the monomer of the general formula (4) may be selected appropriately in accordance with purpose and use application from such polymerization methods as bulk polymerization, solution polymerization and emulsion polymerization. Solution polymerization and bulk polymerization are advantageous in industry and are preferable in view of easy control of the structure such as molecular weight. The polymerization method may be based on any polymerization mechanism such as radical polymerization, anionic polymerization, cationic polymerization or coordination polymerization. The polymerization based on radical polymerization mechanism is advantageous in industry and is preferable.

When the monomer of the general formula (4) is polymerized by radical polymerization mechanism, the use of a thermal radical polymerization initiator which generates radicals by being heated, or a photo radical polymerization initiator which is decomposed by irradiation to generate radicals is advantageous in industry and is preferable. Such polymerization initiators are not particularly limited and may be selected appropriately in accordance with polymerization conditions such as polymerization temperature and the types of the solvent and the monomer to be polymerized. The initiators may be used alone, or two or more kinds thereof may be used in combination. Further, the polymerization initiator may be used in combination with a reducing agent such as a transition metal salt or an amine.

The thermal radical polymerization initiators are not particularly limited as long as they generate radicals when supplied with thermal energy to initiate the polymerization. Examples thereof include peroxides such as 3-hydroxy-1,1-dimethylbutyl peroxyneodecanoate, α-cumyl peroxyneodecanoate, 1,1,3,3-tetramethylbutyl peroxyneodecanoate, t-amyl peroxyneodecanoate, t-butyl peroxyneodecanoate, di(2-ethylhexyl) peroxydicarbonate, di(s-butyl) peroxydicarbonate, t-butyl peroxyneoheptanoate, t-amyl peroxypivalate, t-butyl peroxypivalate, diisononanoyl peroxide, dilauroyl peroxide, 1,1,3,3-tetramethylbutyl peroxy-2-ethylhexanoate, dibenzoyl peroxide, t-amyl peroxy-2-ethylhexanoate, t-butyl peroxy-2-ethylhexanoate, t-butyl peroxyisobutyrate, 1,1-di(t-amylperoxy)cyclohexane, t-amyl peroxyisononanoate, t-amyl peroxy-n-octoate, 1,1-di(t-butylperoxy)cyclohexane, t-amyl peroxyisopropyl carbonate, t-butyl peroxyisopropyl carbonate, t-amyl peroxy-2-ethylhexyl carbonate, t-butyl peroxy-2-ethylhexyl carbonate, t-amyl peroxybenzoate, t-amyl peroxyacetate, t-butyl peroxyacetate, t-butyl peroxyisononanoate, t-butyl peroxybenzoate, 2,2-di(t-butylperoxy)butane, n-butyl 4,4-di(t-butylperoxy)valerate, methyl ethyl ketone peroxide, ethyl 3,3-di(t-butylperoxy)butyrate, 1,3-di(2-t-butylperoxyisopropyl)benzene, dicumyl peroxide, 2,5-dimethyl-2,5-di(t-butylperoxy)hexane, di-t-amyl peroxide, di-t-butyl peroxide, 1,1,3,3-tetramethylbutyl hydroperoxide, 2,5-dimethyl-2,5-di(t-butylperoxy)hexyne-3, t-amyl hydroperoxide, t-butyl hydroperoxide, hydrogen peroxide and persulfate salts; and azo compounds such as 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2,2'-azobis[2-(2-imidazolin-2-yl)propane]dihydrochloride, 2,2'-azobis[2-(2-imidazolin-2-yl)propane]disulfate dihydrate, 2,2'-azobis[2-(2-imidazolin-2-yl)propane], 2,2'-azobis(2-amidinopropane)dihydrochloride, 2,2'-azobis[N-(2-carboxyethyl)-2-methylpropionamidine] n-hydrate, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), dimethyl 2,2'-azobis(isobutyrate), 4,4'-azobis(4-cyanopentanoic acid) and 1,1-azobis(1-acetoxy-1-phenylethane). Preferred initiators are di-t-butyl peroxide, 2,2'-azobisisobutyronitrile, 2,2'-azobis(2,4-dimethylvaleronitrile), 2,2'-azobis(2-methylbutyronitrile), 1,1-azobis(1-acetoxy-1-phenylethane), 2,2'-azobis(N-butyl-2-methylpropionamide), dicumyl peroxide, dibenzoyl peroxide and dilauroyl peroxide.

The photo radical polymerization initiators are not particularly limited as long as they are decomposed by irradiation and generate radicals to initiate the polymerization. Examples thereof include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy)phenyl-(2-hydroxy-2-propyl) ketone, 2,4,6-trimethylbenzoyl-diphenylphosphine oxide, bis-(2,6-dimethoxybenzoyl)-2,4,4-trimethylpentylphosphine oxide and oligo(2-hydroxy-2-methyl-1-(4-(1-methylvinyl)phenyl)propanone).

The amount of the polymerization initiators used is not particularly limited and may be determined appropriately in accordance with polymerization conditions such as the types and amounts of the monomers used, polymerization temperature and polymerization concentration, and desired structures of polymers such as molecular weight. To obtain a polymer having a weight-average molecular weight in terms of polystyrene of 1,000 to 1,000,000, the amount is preferably 0.01 to 20 mol %, more preferably 0.05 to 15 mol %, and even more preferably 0.1 to 10 mol % relative to the total number of moles of the monomers.

When the monomer of the general formula (4) is polymerized by radical polymerization mechanism, a chain transfer agent may be used as required and is more preferably used in combination with the radical polymerization initiator. The use of a chain transfer agent in the polymerization tends to make it possible to prevent an increase in molecular weight distribution, and the occurrence of gelation. Specific examples of the chain transfer agents include, but are not limited to, mercaptocarboxylic acids such as mercaptoacetic acid and 3-mercaptopropionic acid; mercaptocarboxylates such as methyl mercaptoacetate, methyl 3-mercaptopropionate, 2-ethylhexyl 3-mercaptopropionate, n-octyl 3-mercaptopropionate, methoxybutyl 3-mercaptopropionate, stearyl 3-mercaptopropionate, trimethylolpropane tris(3-mercaptopropionate), pentaerythritol tetrakis(3-mercaptopropionate) and dipentaerythritol hexakis(3-mercaptopropionate); alkyl mercaptans such as ethyl mercaptan, t-butyl mercaptan, n-dodecyl mercaptan and 1,2-dimercaptoethane; mercapto alcohols such as 2-mercaptoethanol and 4-mercapto-1-butanol; aromatic mercaptans such as benzenethiol, m-toluenethiol, p-toluenethiol and 2-naphthalenethiol; mercapto isocyanurates such as tris[(3-mercaptopropionyloxy)-ethyl] isocyanurate; disulfides such as 2-hydroxyethyl disulfide and tetraethylthiuram disulfide; dithiocarbamates such as benzyl diethyldithiocarbamate; monomer dimers such as α-methylstyrene dimer; and halogenated alkyls such as carbon tetrabromide. Of these, mercapto group-containing compounds such as mercaptocarboxylic acids, mercaptocarboxylates, alkyl mercaptans, mercapto alcohols, aromatic mercaptans; and mercapto isocyanurates are preferable for reasons such as availability, crosslinking prevention performance and small decrease in polymerization rate. Alkyl mercaptans, mercaptocarboxylic acids and mercaptocarboxylates are most preferable. These may be used alone, or two or more kinds thereof may be used in combination.

The amount of the chain transfer agent used is not particularly limited and may be determined appropriately in accordance with polymerization conditions such as the types and amounts of the monomers used, polymerization temperature and polymerization concentration, and desired structures of polymers such as molecular weight. To obtain a polymer having a weight-average molecular weight in terms of polystyrene of 1,000 to 1,000,000, the amount is preferably 0.01 to 20 mol %, more preferably 0.05 to 15 mol %, and even more preferably 0.1 to 10 mol % relative to the total number of moles of the monomers.

When the monomer of the general formula (4) is polymerized by radical polymerization mechanism using a polymerization initiator which generates radicals when heated, the polymerization temperature may be determined appropriately in accordance with conditions such as the types and amounts of the monomers used, and the types and amounts of the polymerization initiators, but is preferably 30 to 200° C., and more preferably 60 to 170° C.

When the monomer of the general formula (4) is liquid at the time of polymerization, bulk polymerization is preferably selected from the point of view of productivity. Bulk polymerization conditions may be selected appropriately in accordance with the types of the monomers used.

When the monomer of the general formula (4) is polymerized by a solution polymerization method, the solvent used for the polymerization is not particularly limited as long as it is inactive in the polymerization reaction, and may be selected appropriately in accordance with polymerization conditions such as polymerization mechanism, the types and amounts of the monomers used, polymerization temperature and polymerization concentration. Examples thereof include, but are not limited to, aromatic hydrocarbon solvents such as benzene, toluene, xylene, mesitylene, monochlorobenzene, monobromobenzene, dichlorobenzene and trichlorobenzene; aliphatic hydrocarbon solvents such as n-hexane, n-heptane, n-octane, cyclopentane, cyclohexane, dichloromethane, dibromomethane, chloroform, carbon tetrachloride, ethylene dichloride, 1,1,1-trichloroethane and trichloroethylene; ether solvents such as diethyl ether, 1,2-dimethoxyethane, tetrahydrofuran, 1,4-dioxane and cyclopentyl methyl ether; amide solvents such as N-methyl-2-pyrrolidone, N,N-dimethylacetamide, N,N-dimethylformamide, 1,3-dimethyl-2-imidazolidinone, tetramethylurea and 1,3-dimethyl-3,4,5,6-tetrahydro-2(1H)-pyrimidinone; alcohol solvents such as methanol, ethanol, isopropyl alcohol, n-propyl alcohol, isobutanol, n-butyl alcohol, s-butanol, t-butanol and ethylene glycol; ester solvents such as methyl acetate, ethyl acetate, butyl acetate, ethyl propionate, γ-butyrolactone and γ-valerolactone; ketone solvents such as acetone, methyl ethyl ketone, methyl isobutyl ketone, cyclopentanone and cyclohexanone; sulfur-containing solvents such as dimethylsulfoxide; nitrogen-containing solvents such as picoline and pyridine; and nitrile solvents such as acetonitrile and benzonitrile. These may be used alone, or two or more kinds thereof may be used in combination. Of the solvents, toluene, xylene, monochlorobenzene, dichloromethane, tetrahydrofuran, cyclopentyl methyl ether, N-methyl-2-pyrrolidone, N,N-dimethylacetamide, N,N-dimethylformamide, methanol, ethanol, isopropyl alcohol, n-propyl alcohol, isobutanol, acetone, methyl ethyl ketone, methyl isobutyl ketone, dimethylsulfoxide and acetonitrile are preferable in view of the solubility of the monomers, little impact on the human body and the environment, and high availability in industry.

When the monomer of the general formula (4) is polymerized by a solution polymerization method, the amount of the solvent used is preferably 10 to 5,000 parts by weight, and more preferably 50 to 1,000 parts by weight per 100 parts by weight of the total of the monomers.

In the production method of the invention, the polymerization time may be selected appropriately in accordance with conditions such as the amounts and types of the starting substances used, the presence or absence and the type of a solvent, and the reaction temperature. Usually, the polymerization time is preferably 1 minute to 72 hours, and, from the point of view of workability, more preferably 10 minutes to 48 hours.

After the completion of the polymerization, the polymer which has structural units of the general formula (1) may be isolated from the reaction solution using a common method. The isolation method is not particularly limited. Examples include method of concentrating the polymerization solvent and/or adding the solution into a poor solvent to precipitate the solid.

The polymer isolated may be further purified by a method such as column chromatography or reprecipitation as required, and may be dried and/or melted and pelletized as required.

EXAMPLES

Hereinbelow, the present invention will be described by presenting specific examples, but the scope of the invention is not limited to the contents of such examples. The HPLC purity, 5% weight loss temperature, glass transition temperature (or melting point), weight-average molecular weight, MALDI-TOFMS, bromine content, and $^1$H-NMR, $^{13}$C-NMR and infrared absorption (FT-IR) spectra of compounds obtained in Examples and Synthetic Examples were measured by the methods described below.

HPLC purity: Measured by high-performance liquid chromatography (HPLC) and calculated based on area percentage. The measurement conditions are as follows.

Sample preparation: Sample weighing 1.0 mg was dissolved into 1.0 mL of acetonitrile.

Detector: SPD-10AVP (manufactured by Shimadzu Corporation)

Oven: CTO-10AVP (manufactured by Shimadzu Corporation)

Pump: LC-10ADVP (manufactured by Shimadzu Corporation)

Column: ODS-80™ (manufactured by TOSOH CORPORATION)

Eluent: acetonitrile/water/phosphoric acid=600/400/0.5

Column temperature: 40° C.

Flow rate: 1.0 mL/min

Wavelength: 254 nm

5% Weight loss temperature: Sample weighing approximately 10 mg was placed into an aluminum cell, which was then placed in a thermogravimetric differential thermal analyzer (DTG-60 manufactured by Shimadzu Corporation). Under a stream of nitrogen, the sample was heated from 40 to 600° C. at a heatup rate of 10° C./min. The temperature up to which the weight had been decreased by 5% from the start of the measurement was recorded.

Glass transition temperature: Sample weighing approximately 5 mg was sealed into an aluminum pan, which was then placed in a differential scanning calorimeter (DSC-60 manufactured by Shimadzu Corporation). In a nitrogen atmosphere, the sample was heated from 100° C. to 300° C. at a heatup rate of 20° C./min two times. The DSC curve recorded during the second heating was extrapolated and the glass transition temperature was calculated with an analysis software.

Melting point: Sample weighing approximately 5 mg was sealed into an aluminum pan, which was then placed in a differential scanning calorimeter (DSC-60 manufactured by Shimadzu Corporation). In a nitrogen atmosphere, the sample was heated from 40 to 200° C. at a heatup rate of 10° C./min. The DSC curve obtained was extrapolated and the melting point was calculated with an analysis software.

Weight-average molecular weight: The measurement was performed by a gel permeation chromatography method. A calibration curve of molecular weights of up to about 1,200,000 was prepared beforehand using standard polystyrenes manufactured by TOSOH CORPORATION. The chromatographic data obtained was processed with a data processor to calculate the weight-average molecular weight in terms of the standard polystyrenes. The analysis conditions are described below.

Sample preparation: Sample weighing 0.01 g was dissolved into 10 mL of tetrahydrofuran.

Amount of injection: 10 μL

Detector: SPD-M10AVP (manufactured by Shimadzu Corporation)

Oven: CTO-10A (manufactured by Shimadzu Corporation)

Pump: LC-10AD (manufactured by Shimadzu Corporation)

Degasser: DGU-14A (manufactured by Shimadzu Corporation)

System controller: CBM-10A (manufactured by Shimadzu Corporation)

Columns: Four columns including TSK-Gel G4000Hx1×1, G3000Hx1×1 and G2000Hx1×2 were connected (manufactured by TOSOH CORPORATION).

Mobile phase: tetrahydrofuran

Column temperature: 40° C.

Flow rate: 1.0 mL/min

Wavelength: 254 nm

Matrix assisted laser desorption/ionization-time of flight mass spectrometry (MALDI-TOFMS): 10 mg of a matrix (1,8,9-trihydroxyanthracene), 10 mg of an ionizing agent (sodium trifluoroacetate) and 3 mg of a measurement sample were dissolved into 1 mL of tetrahydrofuran. 30 μL of the solution was dropped onto a measurement plate and was dried. The sample thus prepared was analyzed with a MALDI-TOFMS analyzer (AXIMA Confidence manufactured by Shimadzu Corporation).

Bromine content: The measurement was performed by a method in accordance with JIS K 7229 (flask combustion method). Because the compound in Synthetic Example 5 contained fluorine, the sample for determination prepared by the flask combustion method was analyzed with ion chromatograph DX-320 manufactured by Dionex. The analysis conditions are described below.

Sample preparation: Sample weighing 20 mg was obtained by a method in accordance with JIS K 7229 (flask combustion method).

Column: IonPac AS11-HC 4×250 mm (manufactured by Dionex)

Oven: LC-25 (manufactured by Dionex)

Autosampler: AS-50 (manufactured by Dionex)

Eluent generator: EG-40 (manufactured by Dionex)

Pump detector module: IC-25 (manufactured by Dionex)

Flow rate: 1.0 mL/min

Column temperature: 30° C.

Eluent: 5 mM KOH $^1$H-NMR: A solution was prepared which contained the compound of interest and deuterated chloroform (chloroform-$d_1$ containing 0.05% TMS, manufactured by Wako Pure Chemical Industries, Ltd.) or deuterated DMSO (dimethylsulfoxide-$d_6$ containing 0.05% TMS, manufactured by Wako Pure Chemical Industries, Ltd.). $^1$H-NMR measurement was performed by NMR (JNM-AL400 manufactured by JEOL Ltd.).

$^{13}$C-NMR: A solution was prepared which contained the compound of interest and deuterated DMSO (dimethylsulfoxide-$d_6$ containing 0.05% TMS, manufactured by Wako Pure Chemical Industries, Ltd.). $^{13}$C-NMR measurement was performed by NMR (JNM-ECA-500 manufactured by JEOL Ltd.) at a measurement temperature of 40° C.

Infrared absorption spectra (FT-IR): Infrared absorption spectra were measured by a KBr method using an IR spectrometer (Spectrum 100 FT-IR Spectrometer manufactured by PerkinElmer Co., Ltd.).

Synthetic Example 1

Synthesis of
N-(2,4,6-tribromophenyl)dimethacrylamide

An evaporation flask equipped with a condenser was loaded with 1.65 g (5.00 mmol) of 2,4,6-tribromoaniline (manufactured by MANAC INC.), 5.00 mL of dichloromethane, 0.09 g (0.736 mmol) of 4-dimethylaminopyridine (manufactured by Tokyo Chemical Industry Co., Ltd.) and 1.52 g (15.0 mmol) of triethylamine (manufactured by Tokyo Chemical Industry Co., Ltd.). In an ice bath, 1.57 g (15.0 mmol) of methacryloyl chloride (manufactured by Tokyo Chemical Industry Co., Ltd.) was added dropwise slowly thereto. The mixture was stirred at room temperature for 6 days. After the completion of the reaction, the reaction solution was distilled under reduced pressure, and the distillate was recrystallized from a hexane/ethyl acetate mixed solvent. The resultant white crystal was dried in vacuum to give 1.49 g (3.20 mmol) of the target compound. The yield was 64%, the HPLC purity 100.0%, the bromine content 51.5%, and the melting point 139° C.

Synthetic Example 2

Synthesis of N-(2,4,6-tribromophenyl)methacrylamide

A 500 mL four-necked flask equipped with a condenser, a thermometer and a gas absorber was loaded with 52.1 g (158 mmol) of 2,4,6-tribromoaniline (manufactured by MANAC INC.), 0.965 g (7.90 mmol) of 4-dimethylaminopyridine (manufactured by Tokyo Chemical Industry Co., Ltd.), 230 mL of monochlorobenzene and 15.9 g (158 mmol) of triethylamine (manufactured by Tokyo Chemical Industry Co., Ltd.). To the mixture, 19.8 g (190 mmol) of methacryloyl chloride (manufactured by Tokyo Chemical Industry Co., Ltd.) was added dropwise. A reflux tube was attached, and the mixture was heated until reflux occurred. After stirring had been performed for 18 hours, the mixture was brought back to room temperature and 200 mL of water was poured to wash and separate the organic phase. After the liquid separation, the reaction liquid was allowed to stand, and thereby a solid was precipitated. The solid was recovered by filtration (44.5 g). Further, 95.0 g of heptane was added to the filtrate and a solid was precipitated and recovered by filtration (8.46 g). The resultant crude product weighing 50.3 g (126 mmol) was recrystallized from toluene. The resultant crystal was dried to give 44.3 g (111 mmol) of the target N-(2,4,6-tribromophenyl)methacrylamide. The yield was 70%, the HPLC purity 99.6%, the bromine content 60.1%, and the melting point 159° C.

Synthetic Example 3

Synthesis of N-(2,4,6-tribromophenyl)diacrylamide

An evaporation flask equipped with a condenser was loaded with 5.00 g (15.1 mmol) of 2,4,6-tribromoaniline (manufactured by MANAC INC.), 0.19 g (1.56 mmol) of 4-dimethylaminopyridine (manufactured by Tokyo Chemical Industry Co., Ltd.), 32 mL of monochlorobenzene, 9.20 g (90.9 mmol) of triethylamine and 0.01 g (0.045 mmol) of 2,6-di-t-butyl-p-cresol (BHT) (manufactured by Tokyo Chemical Industry Co., Ltd.). Further, 5.77 g (45.4 mmol) of 3-chloropropionyl chloride (manufactured by Tokyo Chemical Industry Co., Ltd.) was added dropwise thereto. The mixture was stirred at an inside temperature of 40° C. for 80 minutes. After the completion of the reaction, the reaction solution was filtered and the mother liquid was concentrated under reduced pressure to give a crude product. The resultant crude product was recrystallized from an isopropyl alcohol/heptane (weight ratio=1:1) mixed solvent at 10° C., and the crystal was recovered by filtration. The resultant white crystal was dried by blowing air thereto at 40° C. to give 2.33 g (5.32 mmol) of the target compound. The yield was 35%, the HPLC purity 99.9%, the bromine content 54.8%, and the melting point 99° C.

Synthetic Example 4

Synthesis of N-(2,6-dibromo-4-methylphenyl)dimethacrylamide

An evaporation flask equipped with a condenser was loaded with 3.04 g (11.5 mmol) of 2,6-dibromo-4-methylaniline (manufactured by Tokyo Chemical Industry Co., Ltd.), 23.0 mL of monochlorobenzene, 0.07 g (0.573 mmol) of 4-dimethylaminopyridine (manufactured by Tokyo Chemical Industry Co., Ltd.) and 2.79 g (27.6 mmol) of triethylamine (manufactured by Tokyo Chemical Industry Co., Ltd.). Further, 2.88 g (27.6 mmol) of methacryloyl chloride (manufactured by Tokyo Chemical Industry Co., Ltd.) was added dropwise slowly thereto. The mixture was stirred at an inside temperature of 70° C. for 17 hours. After the completion of the reaction, the reaction solution was filtered and the mother liquid was concentrated under reduced pressure to give a crude product. The resultant crude product was recrystallized from a heptane/monochlorobenzene mixed solvent, and the crystal was recovered by filtration. The resultant white crystal was dried by blowing air thereto at 60° C. to give 2.15 g (5.36 mmol) of the target compound. The yield was 47%, the HPLC purity 100.0%, the bromine content 39.7%, and the melting point 137° C.

Synthetic Example 5

Synthesis of N-(2,6-dibromo-4-trifluoromethoxyphenyl)dimethacrylamide

The procedures in Synthetic Example 4 were repeated, except that 2,6-dibromo-4-methylaniline (manufactured by Tokyo Chemical Industry Co., Ltd.) was replaced by 3.00 g (8.96 mmol) of 2,6-dibromo-4-trifluoromethoxyaniline (manufactured by Tokyo Chemical Industry Co., Ltd.). The resultant crude product was recrystallized from a heptane/monochlorobenzene mixed solvent, and the crystal was recovered by filtration. The resultant white crystal was dried by blowing air thereto at 60° C. to give 1.05 g (2.23 mmol) of the target compound. The yield was 25%, the HPLC purity 99.7%, the bromine content 33.1%, and the melting point 94° C.

Synthetic Example 6

Synthesis of N-(2,6-dibromo-4-nitrophenyl)dimethacrylamide

The procedures in Synthetic Example 4 were repeated, except that 2,6-dibromo-4-methylaniline (manufactured by Tokyo Chemical Industry Co., Ltd.) was replaced by 3.00 g (10.1 mmol) of 2,6-dibromo-4-nitroaniline (manufactured by Tokyo Chemical Industry Co., Ltd.). The resultant crude product was recrystallized from methanol, and the crystal was recovered by filtration. The resultant white crystal was dried by blowing air thereto at 60° C. to give 3.55 g (8.22 mmol) of the target compound. The yield was 81%, the HPLC purity 99.6%, the bromine content 36.6%, and the melting point 141° C.

Reference Example 1

Synthesis of Five-Membered Ring Model Compound

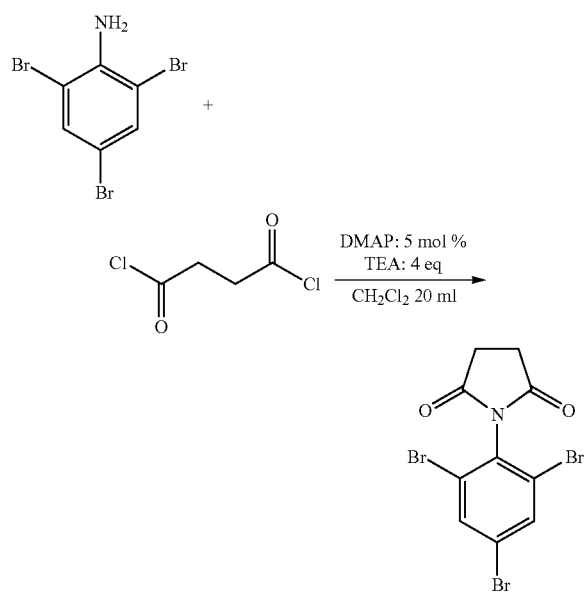

0.659 g (2.00 mmol) of 2,4,6-tribromoaniline (manufactured by MANAC INC.), 0.0500 g (0.409 mmol) of 4-dimethylaminopyridine (DMAP) and 0.700 mL of triethylamine (TEA) were dissolved into 20 mL of dichloromethane. In an ice bath, 0.450 mL of succinyl chloride was added slowly thereto. The mixture was stirred at room temperature for 17 hours. The liquid was separated using saturated brine and ethyl acetate, dried with sodium sulfate, and separated by silica gel column chromatography (ethyl acetate:hexane=1:10→1:2). Recrystallization from ethyl acetate:hexane=1:10 mixed solvent afforded 0.335 g of the target compound. The yield was 41%.

IR: 1724 cm$^{-1}$
$^{13}$C-NMR: 174.88 ppm

Reference Example 2

Synthesis of Six-Membered Ring Model Compound

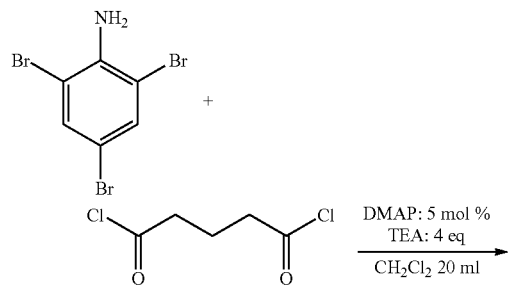

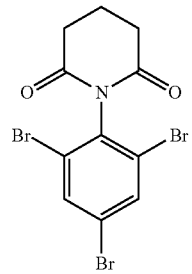

0.653 g (1.98 mmol) of 2,4,6-tribromoaniline (manufactured by MANAC INC.), 0.0255 g (0.209 mmol) of DMAP and 0.700 mL of TEA were dissolved into 20 mL of dichloromethane. In an ice bath, 0.450 mL of glutaryl chloride was added slowly thereto. The mixture was stirred at room temperature for 1 hour. Tracking of the reaction by thin layer chromatography showed that the reaction had not proceeded. Thus, 0.700 mL of TEA and 0.450 mL of glutaryl chloride were further added, and the mixture was stirred at room temperature for 23 hours. The liquid was separated using saturated brine and ethyl acetate, dried with sodium sulfate, and separated by silica gel column chromatography (ethyl acetate:hexane=1:2→1:0). In this manner, 0.0753 g of the target compound was obtained with a yield of 9%.

IR: 1698 cm$^{-1}$
$^{13}$C-NMR: 171.16 ppm

Example 1

Radical polymerization of N-(2,4,6-tribromophenyl)dimethacrylamide

A reaction vessel was loaded with 510 mg (1.09 mmol) of N-(2,4,6-tribromophenyl)dimethacrylamide synthesized in Synthetic Example 1. To the vessel was added 0.1 mL of a solution which had been prepared by dissolving 850 mg of di-t-butyl peroxide (manufactured by Wako Pure Chemical Industries, Ltd.) into 10 mL of diethyl ether (the amount of the radical initiator actually added was 8.5 mg or 0.058 mmol). The diethyl ether was removed under reduced pressure, and the vessel was purged with argon. Stirring was performed at 140° C. for 24 hours. The resultant solid was dissolved into tetrahydrofuran, and the solution was added to 30 mL of methanol. The resultant precipitate was suction filtered and vacuum dried to give the target polymer as a white solid (372 mg, 72% of the theoretical weight). The bromine content was found to be 50.9%, with the theoretical value being 51.4%. The glass transition temperature was 255° C., the 5% weight loss temperature 396° C., and the weight-average molecular weight 7,600 (Mw/Mn 2.1). The $^1$H-NMR of the target polymer is illustrated in FIG. 1A, the $^{13}$C-NMR in FIG. 1B, the FT-IR chart in FIG. 2, and MALDI-TOF-MASS in FIG. 3.

Figure 1B:
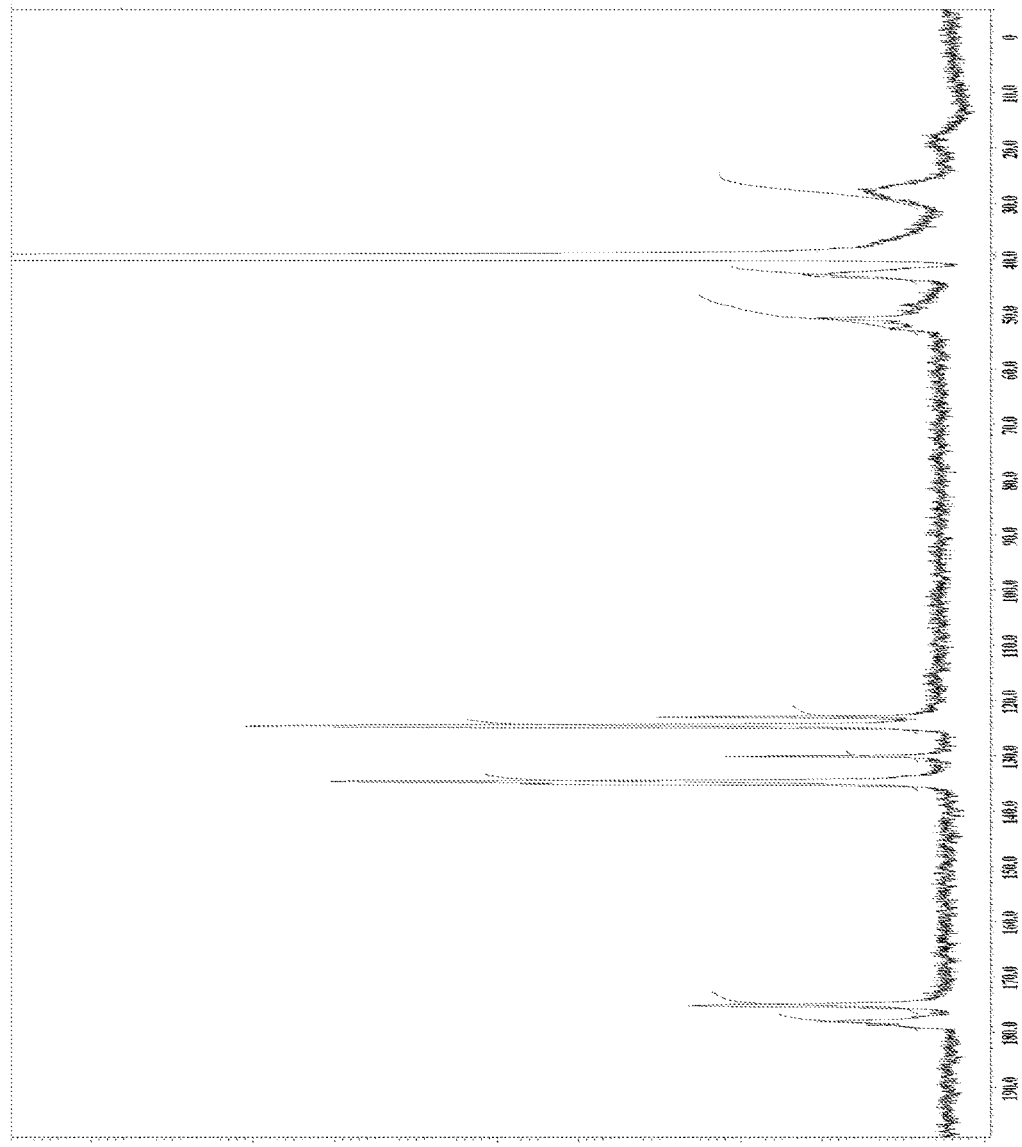
FIG. 1B is a $^{13}$C-NMR chart of the compound obtained in Example 1.
Figure 2:
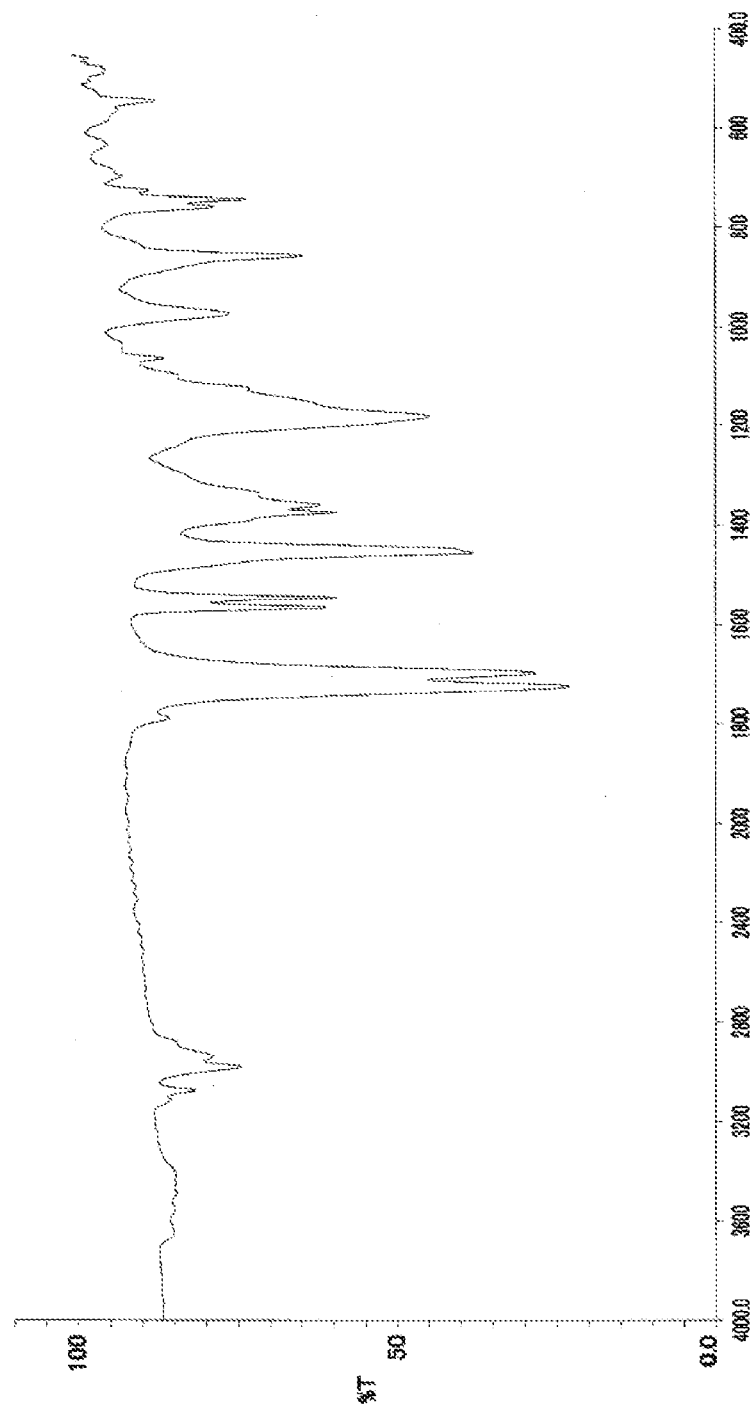
FIG. 2 is an FT-IR chart of the compound obtained in Example 1.
Figure 3:
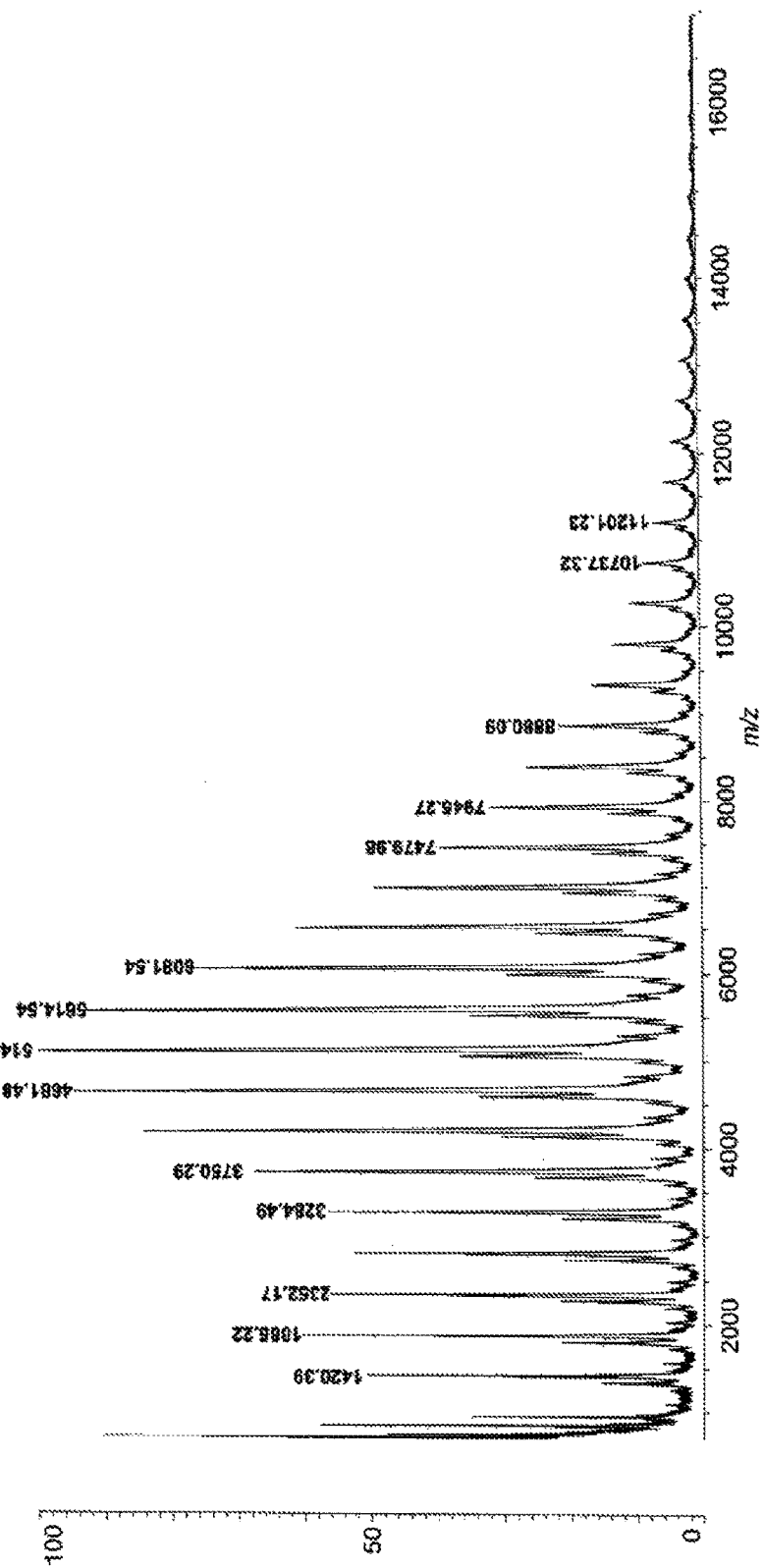
FIG. 3 is a MALDI-TOFMS chart of the compound obtained in Example 1.

As illustrated in FIG. 2, the IR measurement showed two absorption peaks of imide's C=O (1722 cm$^{-1}$ and 1696 cm$^{-1}$). By comparison with the IR measurement results of Reference Examples 1 and 2, the former peak can be assigned to five-membered ring imide structures and the latter to six-membered ring imide structures. Thus, the polymer obtained in Example 1 includes both structural units of the general formula (2) and structural units of the general formula (3). Further, as illustrated in FIG. 1B, the $^{13}$C-NMR measurement showed two signals of imide's C=O (178 ppm and 175 ppm). By comparison with the $^{13}$C-NMR measurement results of Reference Examples 1 and 2, the former signal can be assigned to five-membered ring imide structures and the latter to six-membered ring imide structures. Based on the integral ratio of the two signals, the ratio of the structural units of the general formula (3) (five-membered rings) to the structural units of the general formula (2) (six-membered rings) was calculated to be 1:1.5.

Comparative Example 1

To compare the heat resistance of the polymer obtained in Example 1 to that of major flame retardants, their 5% weight loss temperatures and glass transition temperatures are described in Table 1.

TABLE 1

|  | 5% Weight loss temperature | Glass transition temperature |
|---|---|---|
| Poly-N-(2,4,6-tribromophenyl)dimethacrylimide (Example 1) | 396° C. | 255° C. |
| Polypentabromobenzyl acrylate (FR-1025 manufactured by ICL-IP) | 331° C. | 162° C. |
| Brominated polystyrene (Plasafety ® 1200 manufactured by MANAC INC.) | 364° C. | 166° C. |

Example 2

Figure 4:
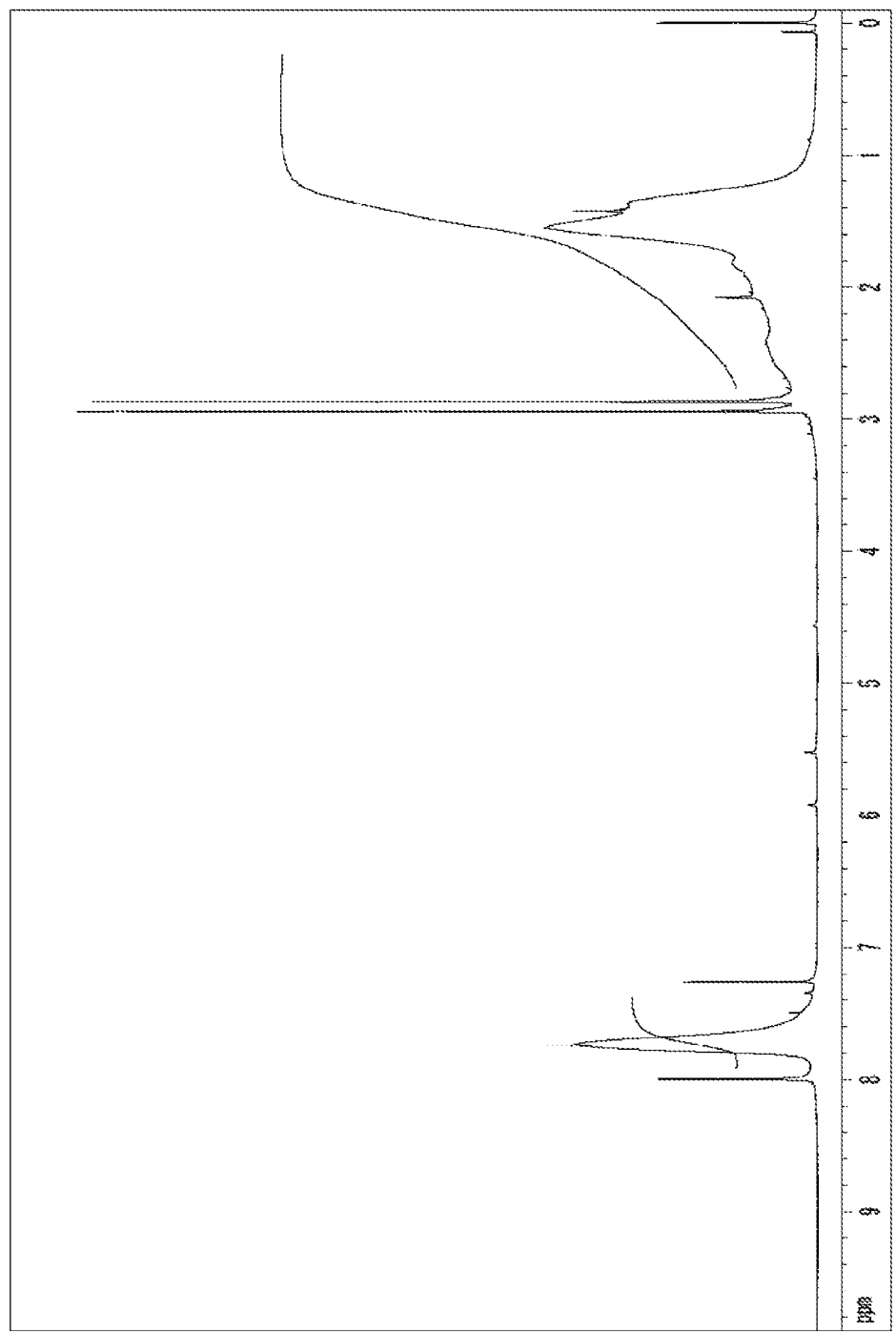
FIG. 4 is a $^1$H-NMR chart of a compound obtained in Example 2.
Figure 5:
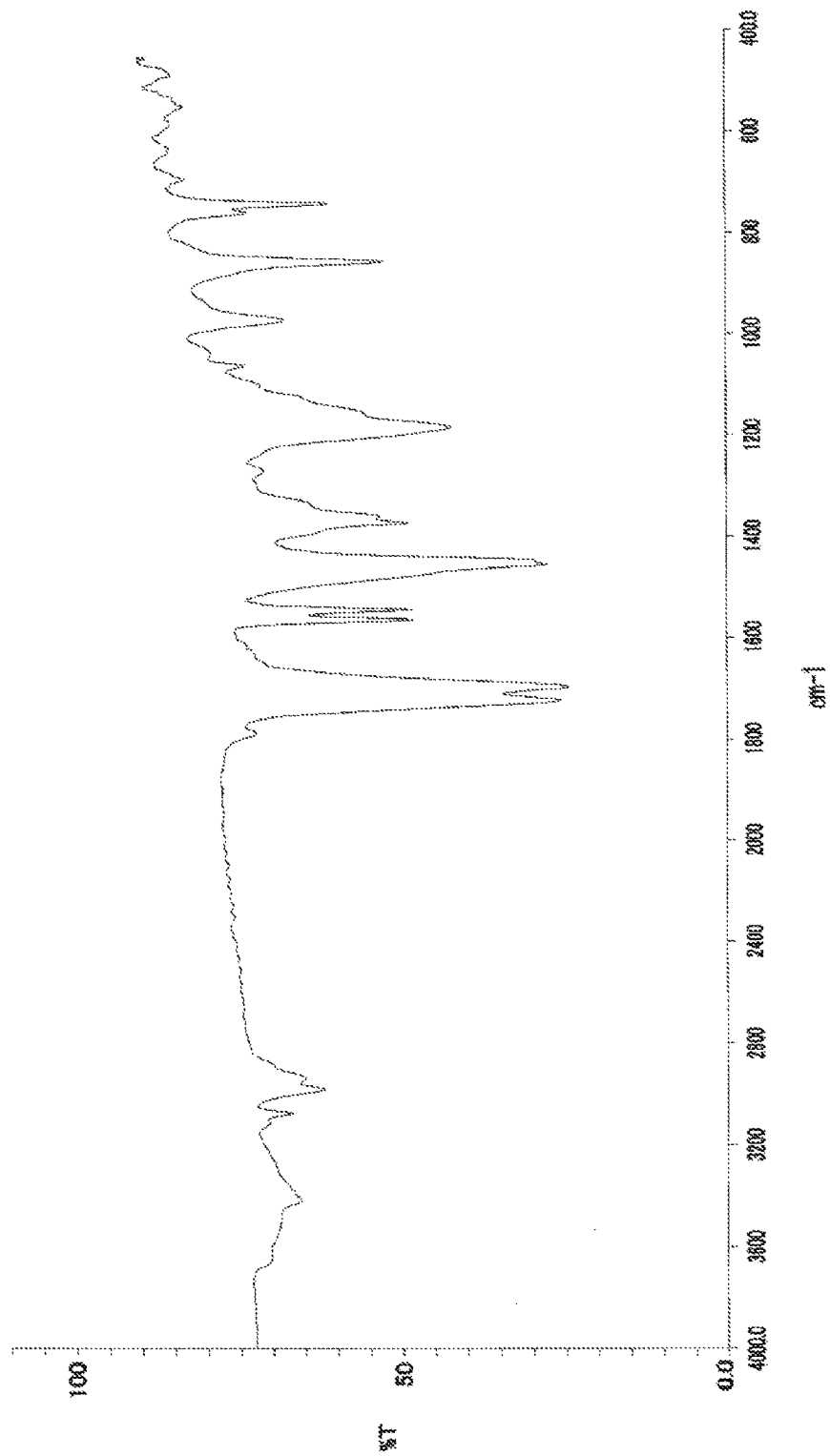
FIG. 5 is an FT-IR chart of the compound obtained in Example 2.

Copolymerization of
N-(2,4,6-tribromophenyl)dimethacrylamide and
N-(2,4,6-tribromophenyl)methacrylamide A reaction vessel was loaded with 234 mg (0.501 mmol) of N-(2,4,6-tribromophenyl)dimethacrylamide synthesized in Synthetic Example 1 and 199 mg (0.501 mmol) of N-(2,4,6-tribromophenyl)methacrylamide synthesized in Synthetic Example 2. To the vessel was added 0.1 mL of a solution which had been prepared by dissolving 360 mg of di-t-butyl peroxide (manufactured by Wako Pure Chemical Industries, Ltd.) into 10 mL of diethyl ether (the amount of the radical initiator actually added was 3.6 mg or 0.025 mmol). The diethyl ether was removed under reduced pressure, and the vessel was purged with argon. Stirring was performed at 160° C. for 24 hours. The resultant solid was dissolved into tetrahydrofuran, and the solution was added to 30 mL of methanol. The resultant precipitate was suction filtered and vacuum dried to give the target copolymer as a white solid (307 mg, 70% of the theoretical weight). The bromine content was found to be 58.8%. The glass transition temperature was 207° C., the 5% weight loss temperature 318° C., and the weight-average molecular weight 4,300 (Mw/Mn 2.1). The $^1$H-NMR of the target copolymer is illustrated in FIG. 4, and the FT-IR chart in FIG. 5.

Example 3

Figure 6:
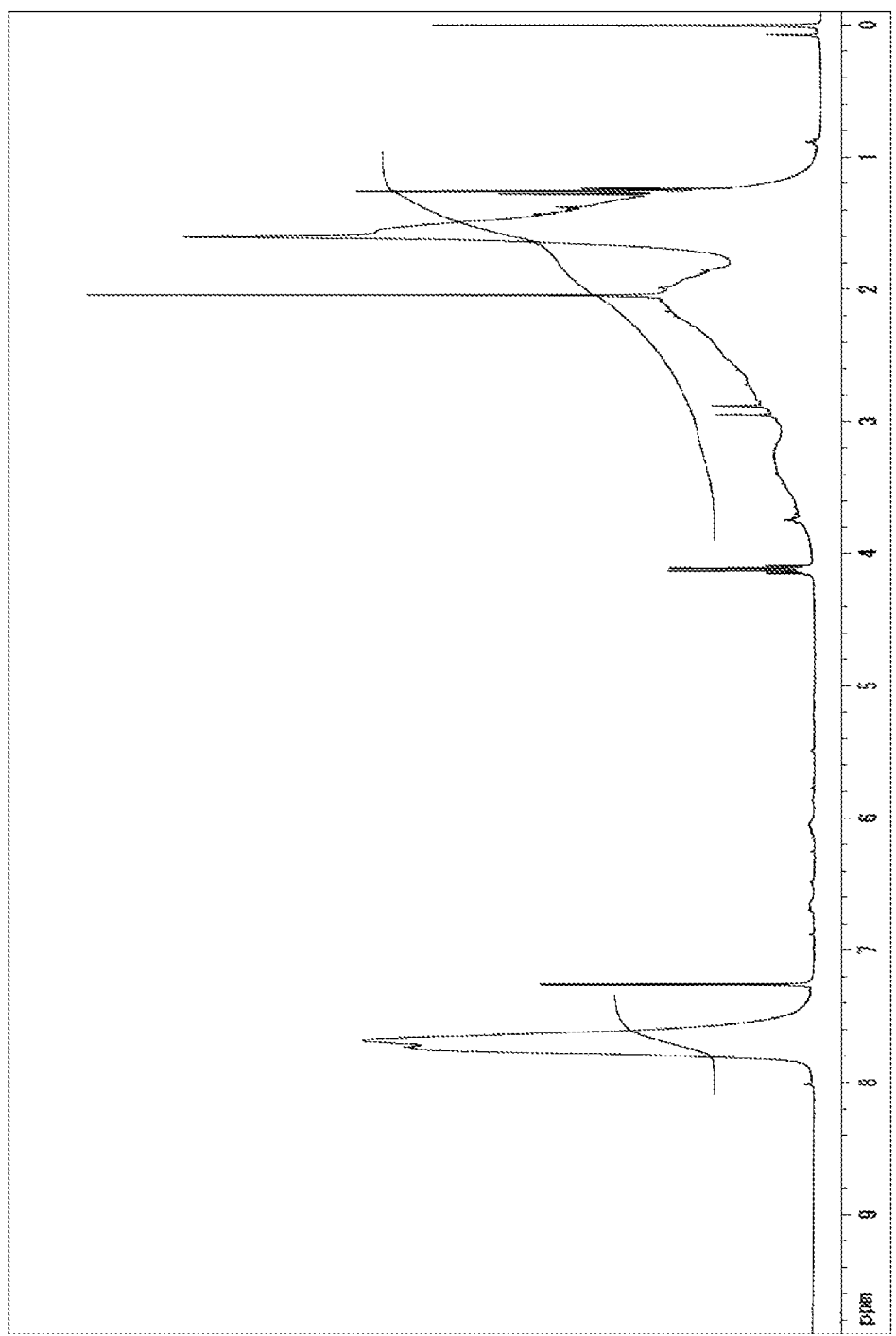
FIG. 6 is a $^1$H-NMR chart of a compound obtained in Example 3.
Figure 7:
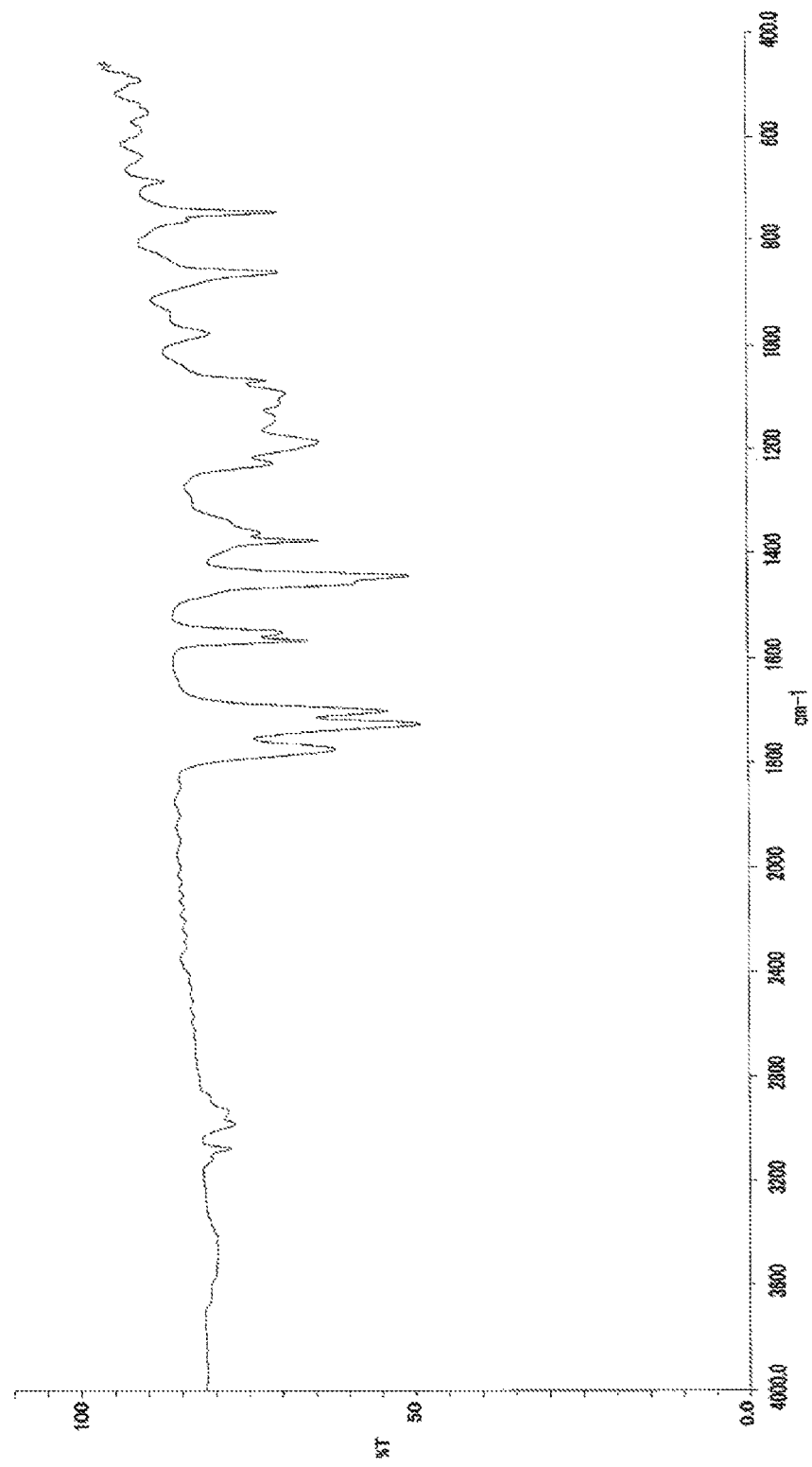
FIG. 7 is an FT-IR chart of the compound obtained in Example 3.

Copolymerization of
N-(2,4,6-tribromophenyl)dimethacrylamide and
(2,4,6-tribromophenyl) acrylate A reaction vessel was loaded with 233 mg (0.500 mmol) of N-(2,4,6-tribromophenyl)dimethacrylamide synthesized in Synthetic Example 1 and 193 mg (0.501 mmol) of (2,4,6-tribromophenyl) acrylate (NEW FRONTIER® BR-30 manufactured by DKS Co. Ltd.). To the vessel was added 0.1 mL of a solution which had been prepared by dissolving 360 mg of di-t-butyl peroxide (manufactured by Wako Pure Chemical Industries, Ltd.) into 10 mL of diethyl ether (the amount of the radical initiator actually added was 3.6 mg or 0.025 mmol). The diethyl ether was removed under reduced pressure, and the vessel was purged with argon. Stirring was performed at 140° C. for 24 hours. The resultant solid was dissolved into tetrahydrofuran, and the solution was added to 30 mL of methanol. The resultant precipitate was suction filtered and vacuum dried to give the target copolymer as a white solid (375 mg, 87% of the theoretical weight). The bromine content was found to be 56.4%. The glass transition temperature was 203° C., the 5% weight loss temperature 340° C., and the weight-average molecular weight 12,600 (Mw/Mn 2.3). The $^1$H-NMR of the target copolymer is illustrated in FIG. 6, and the FT-IR chart in FIG. 7.

Example 4

Copolymerization of
N-(2,4,6-tribromophenyl)dimethacrylamide and
styrene

Figure 8:
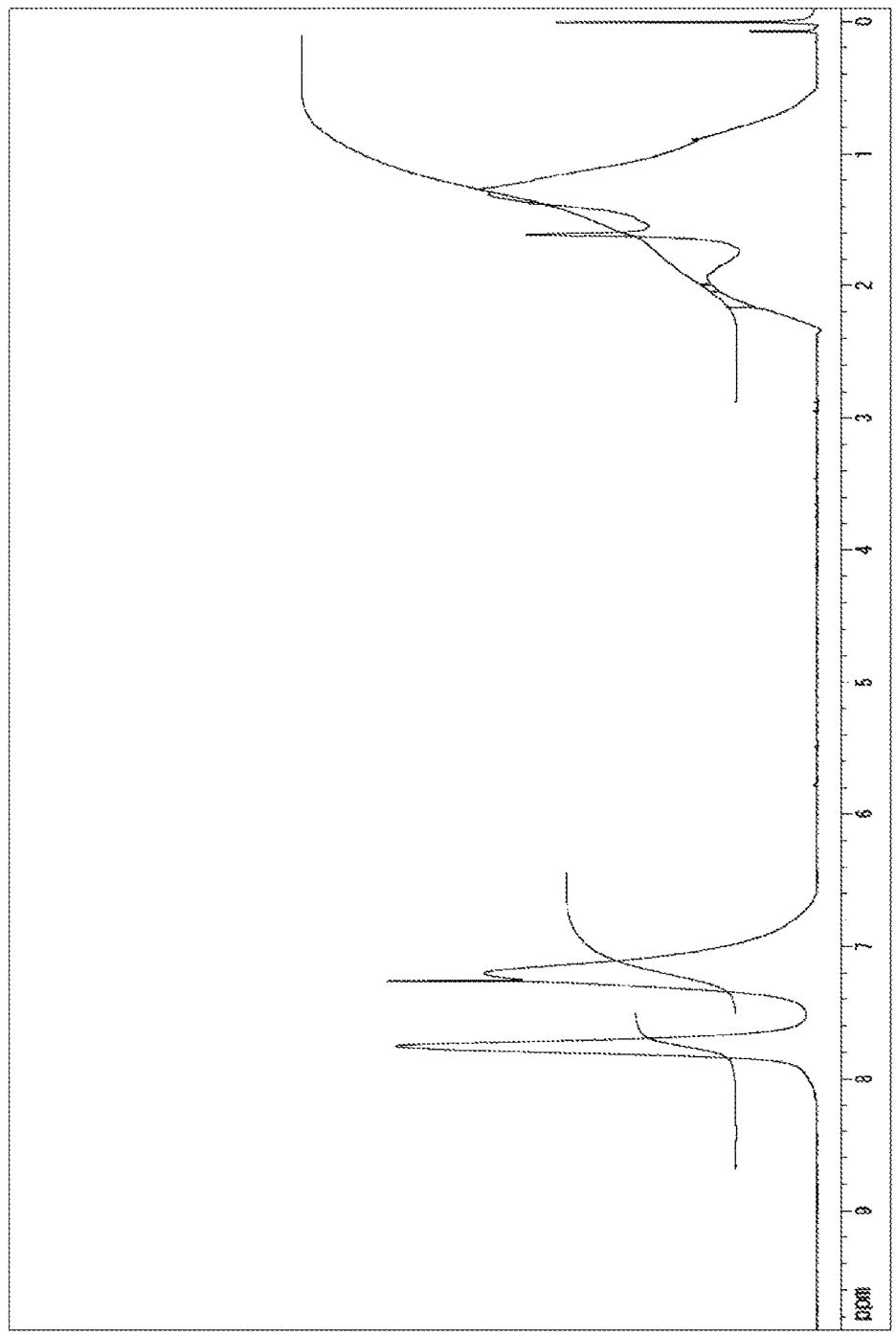
FIG. 8 is a $^1$H-NMR chart of a compound obtained in Example 4.
Figure 9:
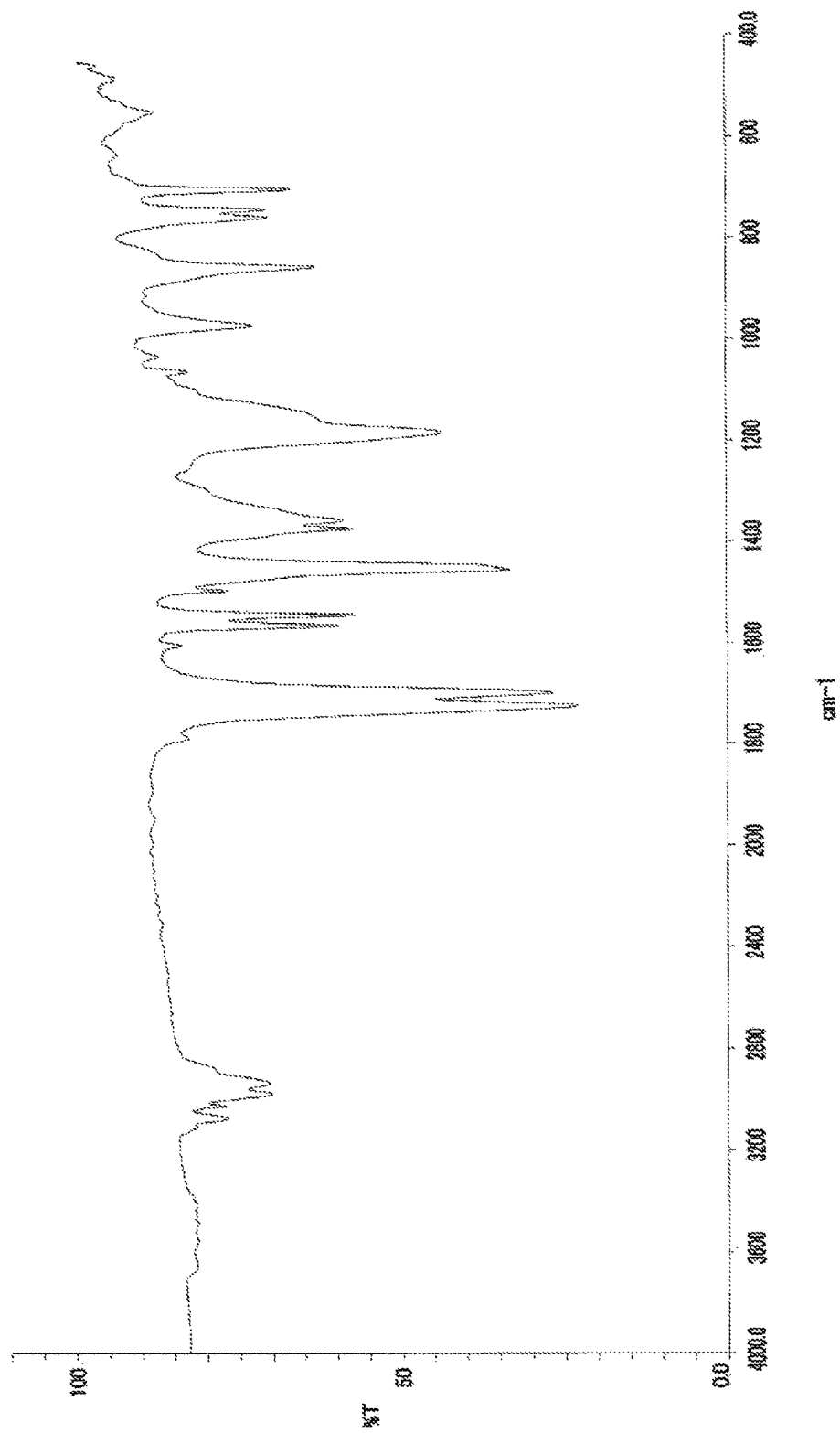
FIG. 9 is an FT-IR chart of the compound obtained in Example 4.

A reaction vessel was loaded with 242 mg (0.518 mmol) of N-(2,4,6-tribromophenyl)dimethacrylamide synthesized in Synthetic Example 1 and 54.0 mg (0.518 mmol) of styrene (manufactured by Wako Pure Chemical Industries, Ltd.). To the vessel was added 0.1 mL of a solution which had been prepared by dissolving 360 mg of di-t-butyl peroxide (manufactured by Wako Pure Chemical Industries, Ltd.) into 10 mL of diethyl ether (the amount of the radical initiator actually added was 3.6 mg or 0.025 mmol). The diethyl ether was removed under reduced pressure, and the vessel was purged with argon. Stirring was performed at 140° C. for 24 hours. The resultant solid was dissolved into tetrahydrofuran, and the solution was added to 30 mL of methanol. The resultant precipitate was suction filtered and vacuum dried to give the target copolymer as a white solid (221 mg, 74% of the theoretical weight). The bromine content was found to be 46.3%. The glass transition temperature was 218° C., the 5% weight loss temperature 369° C., and the weight-average molecular weight 18,300 (Mw/Mn 4.1). The $^1$H-NMR of the target copolymer is illustrated in FIG. 8, and the FT-IR chart in FIG. 9.

Example 5

Figure 10:
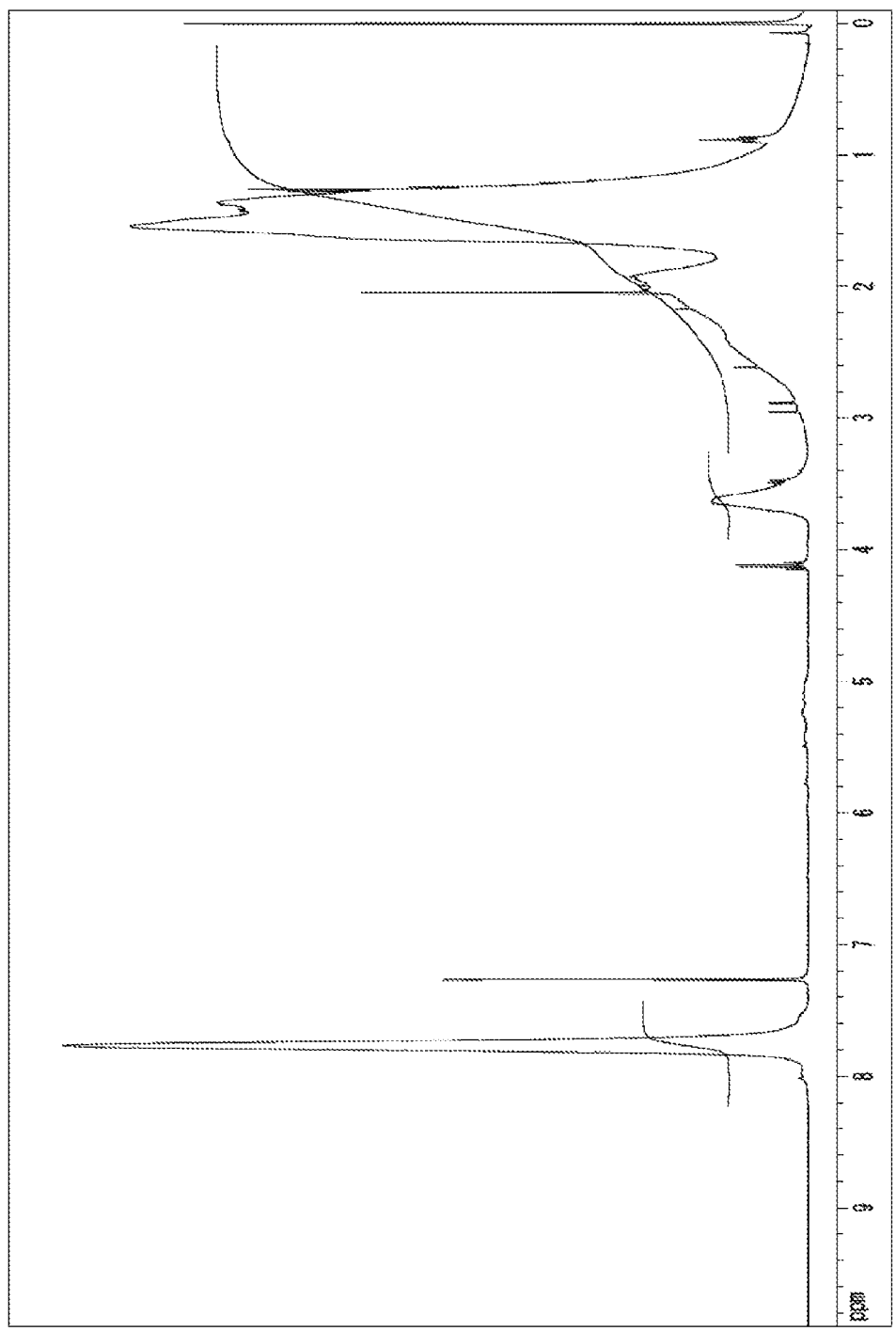
FIG. 10 is a $^1$H-NMR chart of a compound obtained in Example 5.
Figure 11:
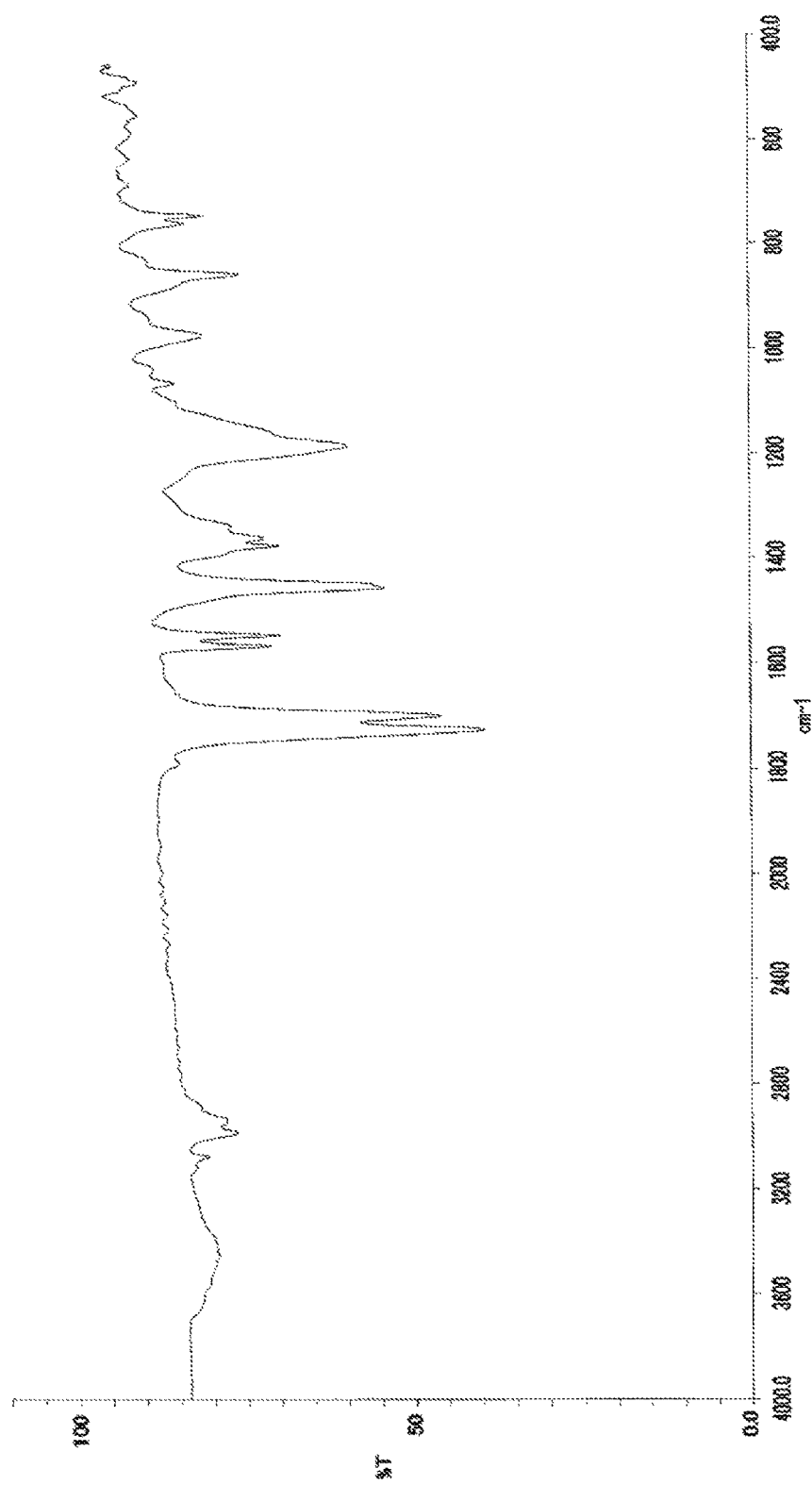
FIG. 11 is an FT-IR chart of the compound obtained in Example 5.

Copolymerization of
N-(2,4,6-tribromophenyl)dimethacrylamide and
methyl methacrylate The copolymerization of N-(2,4,6-tribromophenyl)dimethacrylamide (233 mg, 0.500 mmol) synthesized in Synthetic Example 1 and 51.4 mg (0.513 mmol) of methyl methacrylate (manufactured by Wako Pure Chemical Industries, Ltd.) was performed in the same manner as in Example 4. The resultant solid was dissolved into tetrahydrofuran, and the solution was added to 30 mL of methanol. The resultant precipitate was suction filtered and vacuum dried to give the target copolymer as a white solid (183 mg, 64% of the theoretical weight). The bromine content was found to be 50.3%. The glass transition temperature was 253° C., the 5% weight loss temperature 393° C., and the weight-average molecular weight 9,500 (Mw/Mn 1.9). The $^1$H-NMR of the target copolymer is illustrated in FIG. 10, and the FT-IR chart in FIG. 11.

Example 6

Figure 12:
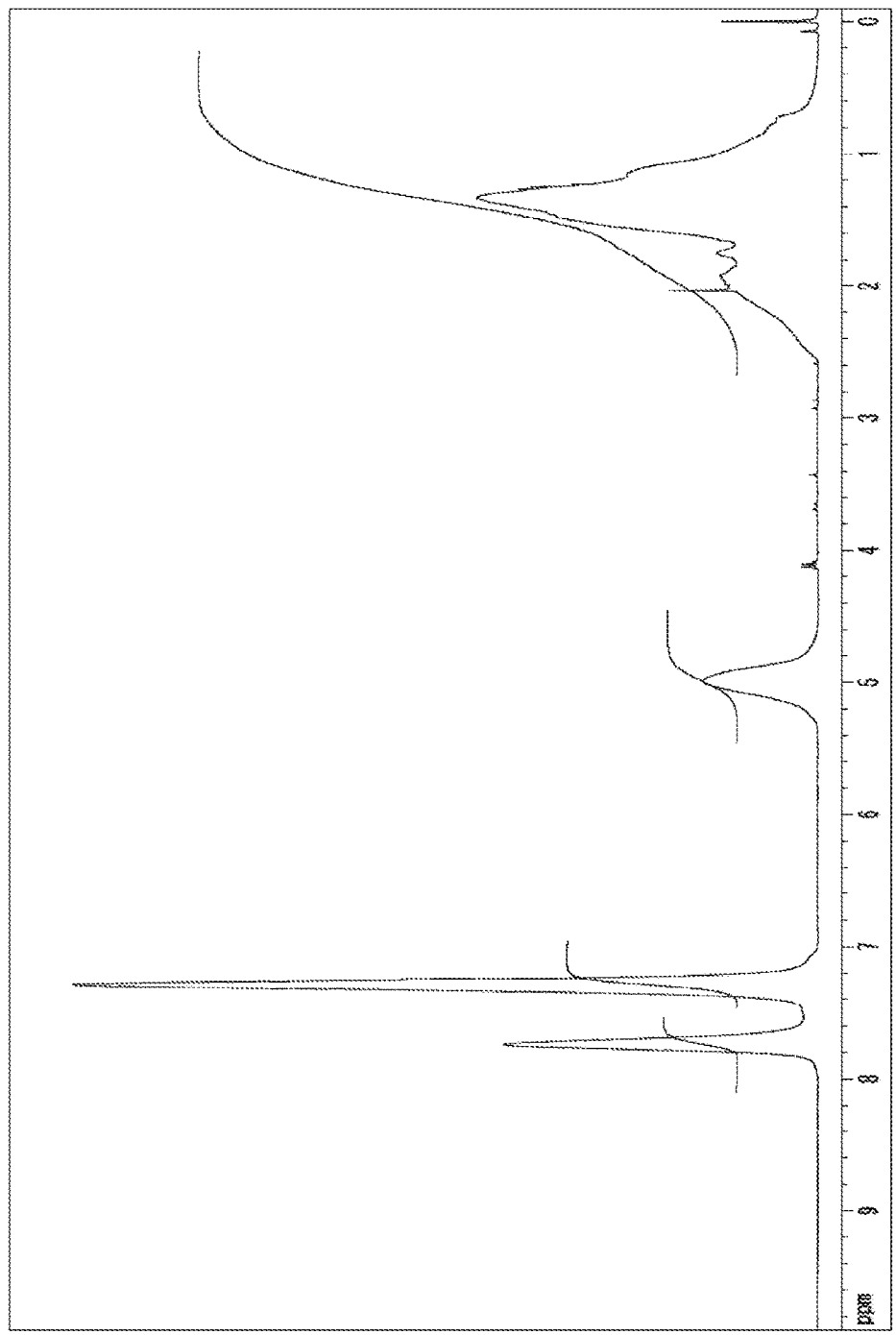
FIG. 12 is a $^1$H-NMR chart of a compound obtained in Example 6.
Figure 13:
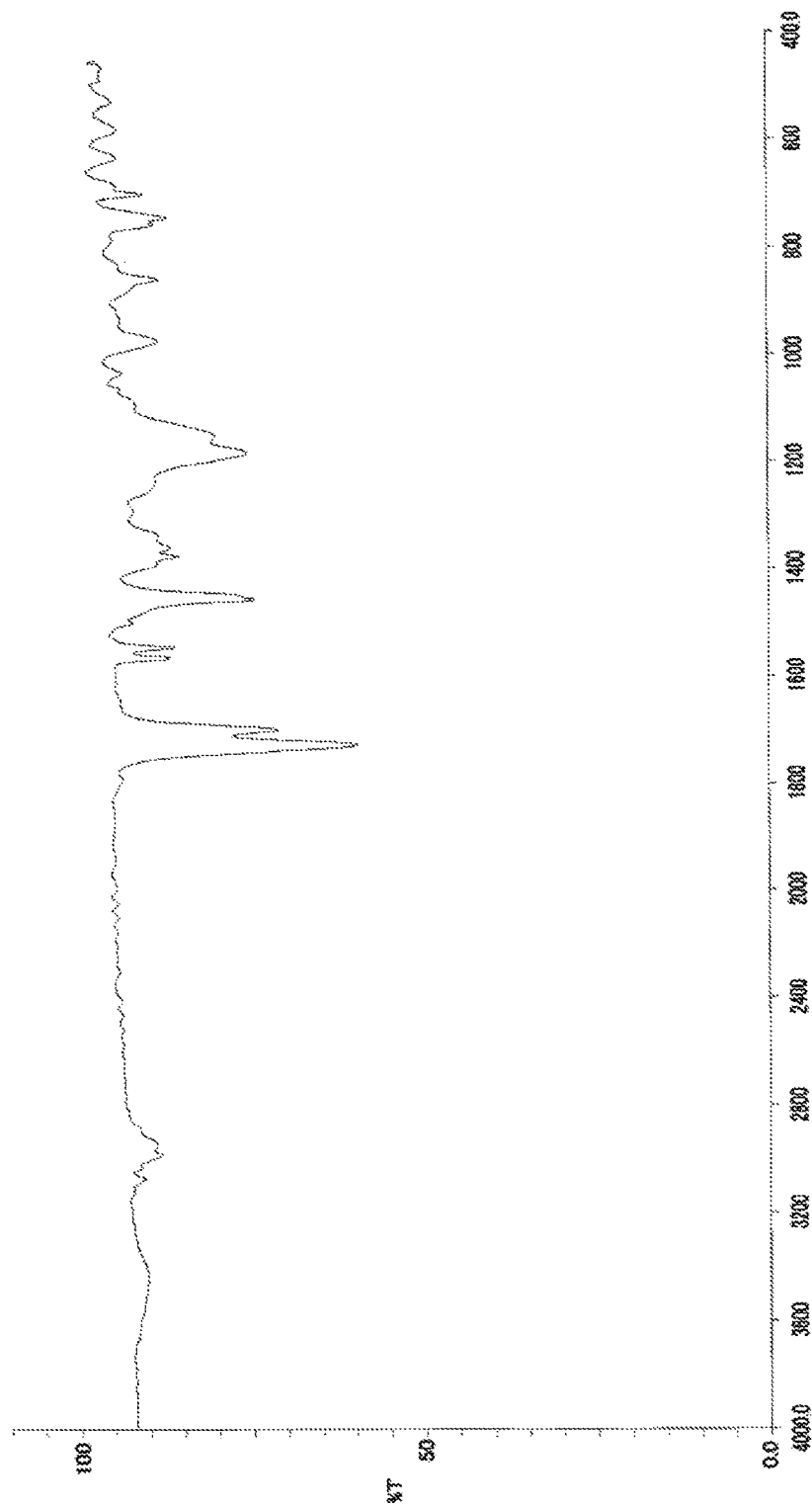
FIG. 13 is an FT-IR chart of the compound obtained in Example 6.

Copolymerization of N-(2,4,6-tribromophenyl)dimethacrylamide and benzyl methacrylate The copolymerization of 233 mg (0.500 mmol) of N-(2,4,6-tribromophenyl)dimethacrylamide synthesized in Synthetic Example 1 and 88.2 mg (0.500 mmol) of benzyl methacrylate (manufactured by Wako Pure Chemical Industries, Ltd.) was performed in the same manner as in Example 4. The resultant solid was dissolved into tetrahydrofuran, and the solution was added to 30 mL of methanol. The resultant precipitate was suction filtered and vacuum dried to give the target copolymer as a white solid (266 mg, 82% of the theoretical weight). The bromine content was found to be 39.1%. The glass transition temperature was 170° C., the 5% weight loss temperature 355° C., and the weight-average molecular weight 15,000 (Mw/Mn 2.0). The $^1$H-NMR of the target copolymer is illustrated in FIG. 12, and the FT-IR chart in FIG. 13.

Example 7

Figure 14:
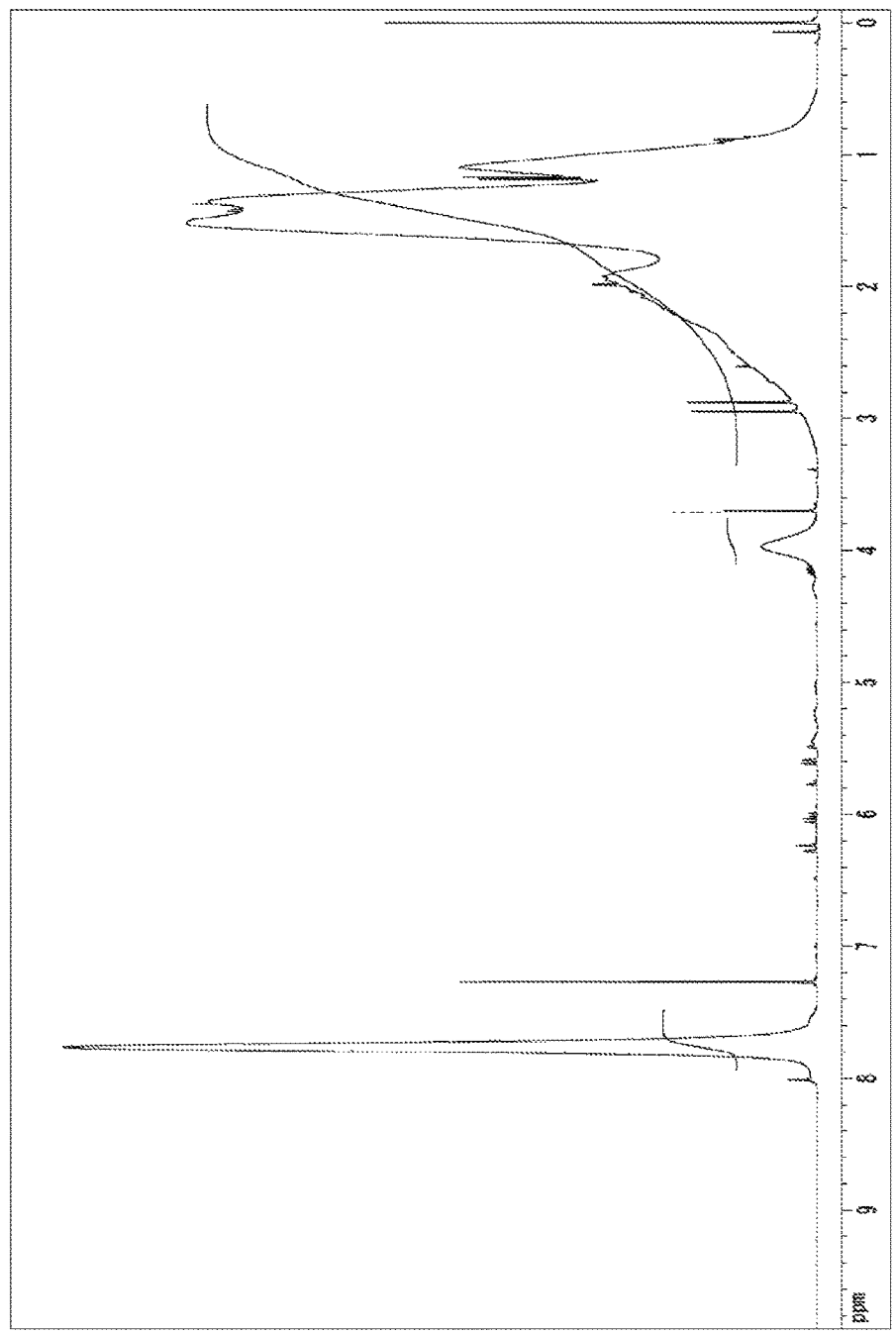
FIG. 14 is a $^1$H-NMR chart of a compound obtained in Example 7.
Figure 15:
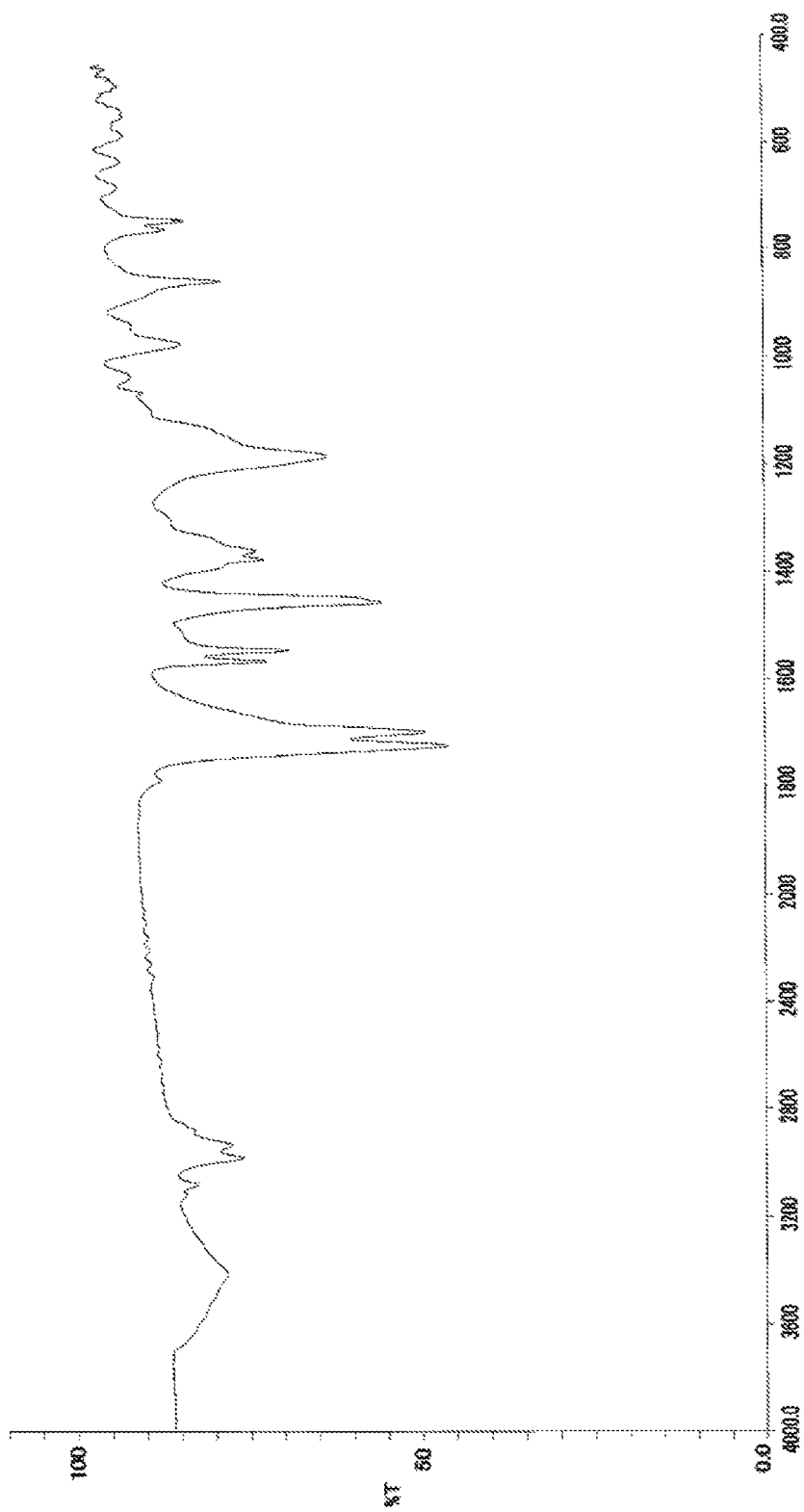
FIG. 15 is an FT-IR chart of the compound obtained in Example 7.

Copolymerization of N-(2,4,6-tribromophenyl)dimethacrylamide and N-isopropylacrylamide The copolymerization of 233 mg (0.500 mmol) of N-(2,4,6-tribromophenyl)dimethacrylamide synthesized in Synthetic Example 1 and 56.6 mg (0.500 mmol) of N-isopropylacrylamide (manufactured by Wako Pure Chemical Industries, Ltd.) was performed in the same manner as in Example 4. The resultant solid was dissolved into tetrahydrofuran, and the solution was added to 30 mL of methanol. The resultant precipitate was suction filtered and vacuum dried to give the target copolymer as a white solid (190 mg, 65% of the theoretical weight). The bromine content was found to be 48.7%. The glass transition temperature was 242° C., the 5% weight loss temperature 365° C., and the weight-average molecular weight 10,800 (Mw/Mn 2.7). The $^1$H-NMR of the target copolymer is illustrated in FIG. 14, and the FT-IR chart in FIG. 15.

Example 8

Figure 16:
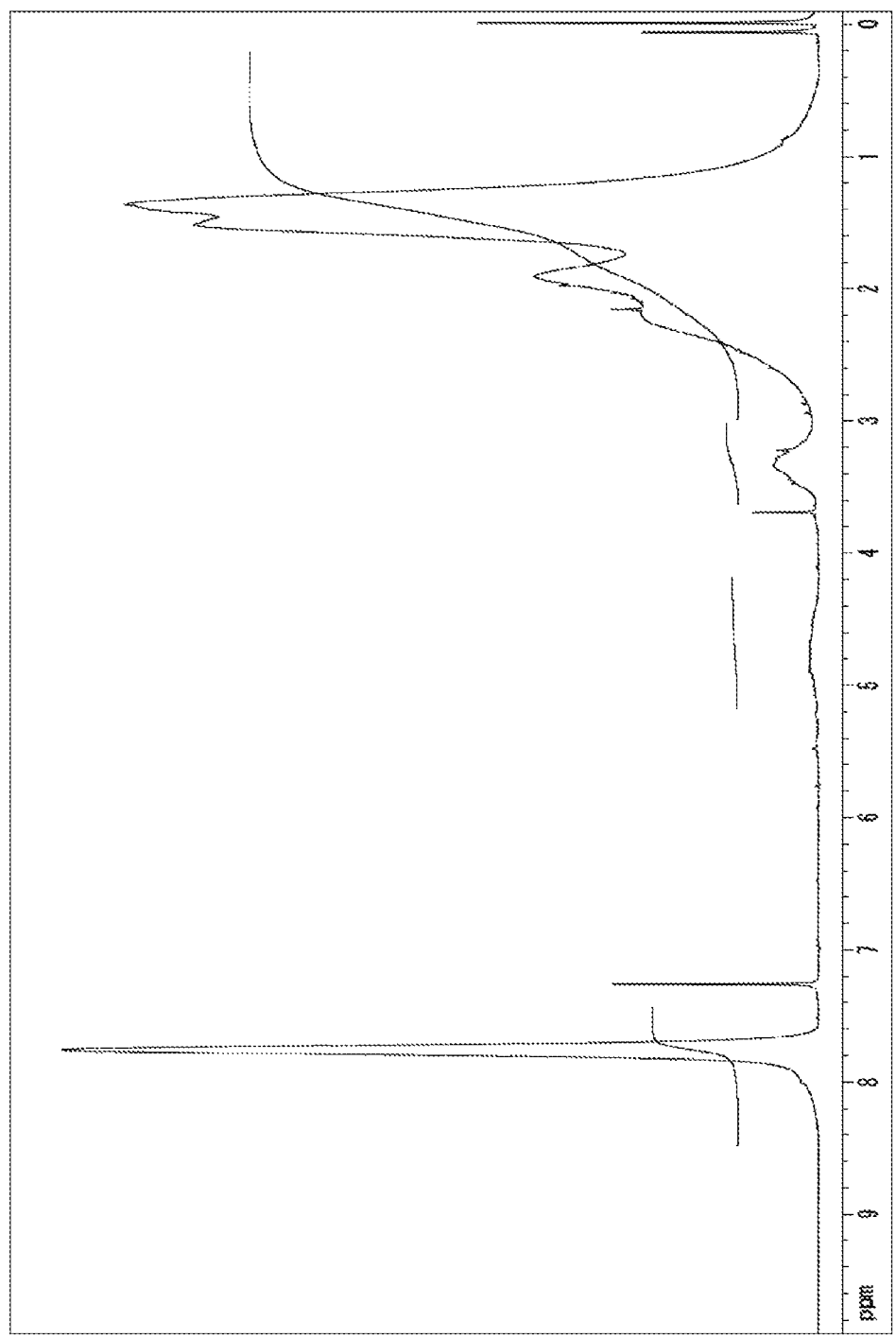
FIG. 16 is a $^1$H-NMR chart of a compound obtained in Example 8.
Figure 17:
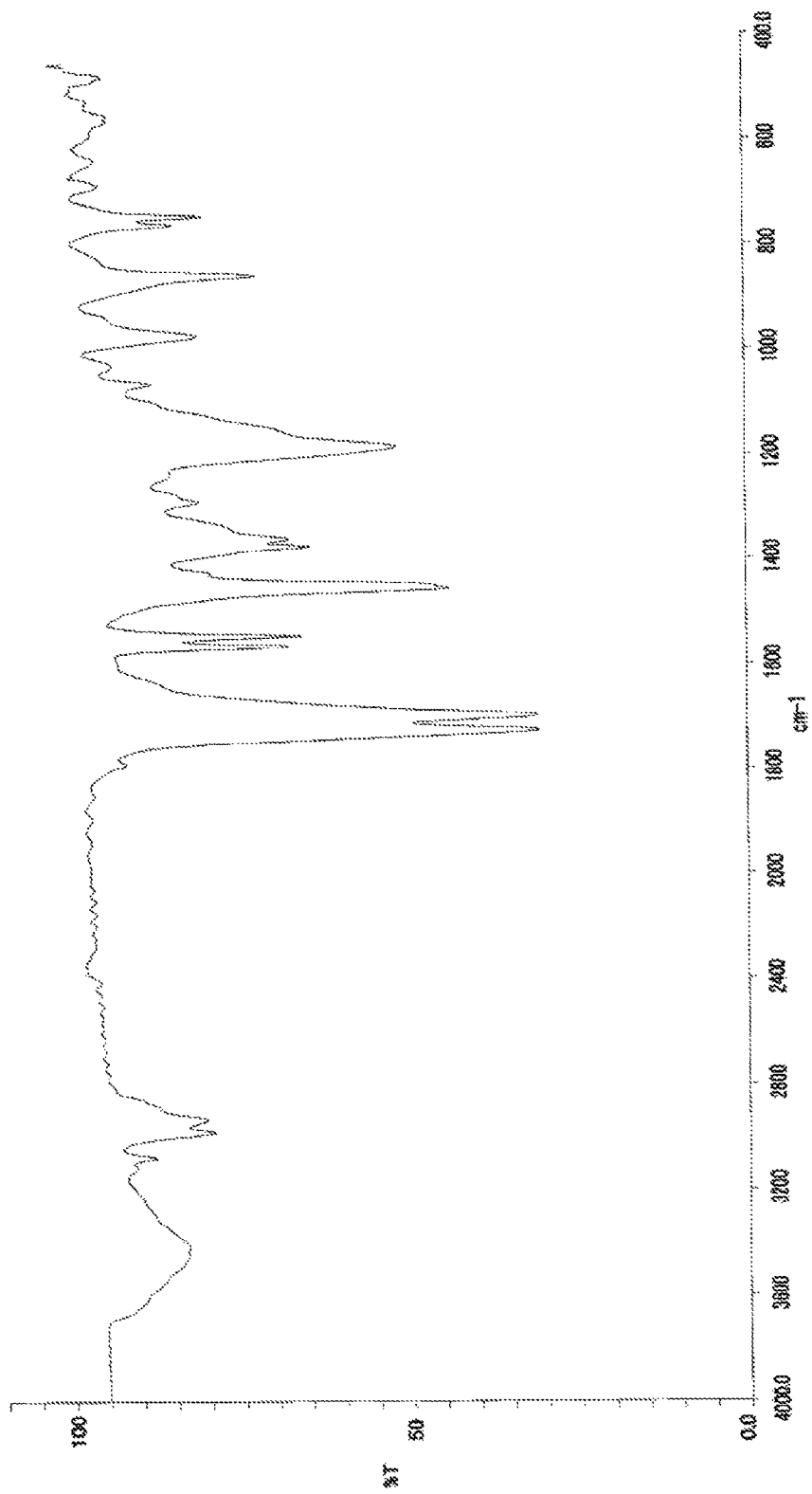
FIG. 17 is an FT-IR chart of the compound obtained in Example 8.

Copolymerization of N-(2,4,6-tribromophenyl)dimethacrylamide and 1-vinyl-2-pyrrolidone The copolymerization of 233 mg (0.500 mmol) of N-(2,4,6-tribromophenyl)dimethacrylamide synthesized in Synthetic Example 1 and 56.5 mg (0.508 mmol) of 1-vinyl-2-pyrrolidone (manufactured by Wako Pure Chemical Industries, Ltd.) was performed in the same manner as in Example 4. The resultant solid was dissolved into tetrahydrofuran, and the solution was added to 30 mL of methanol. The resultant precipitate was suction filtered and vacuum dried to give the target copolymer as a white solid (198 mg, 67% of the theoretical weight). The bromine content was found to be 48.3%. The glass transition temperature was 257° C., the 5% weight loss temperature 387° C., and the weight-average molecular weight 9,600 (Mw/Mn 2.0). The $^1$H-NMR of the target copolymer is illustrated in FIG. 16, and the FT-IR chart in FIG. 17.

Example 9

Radical polymerization of N-(2,4,6-tribromophenyl)dimethacrylamide

Figure 18A:
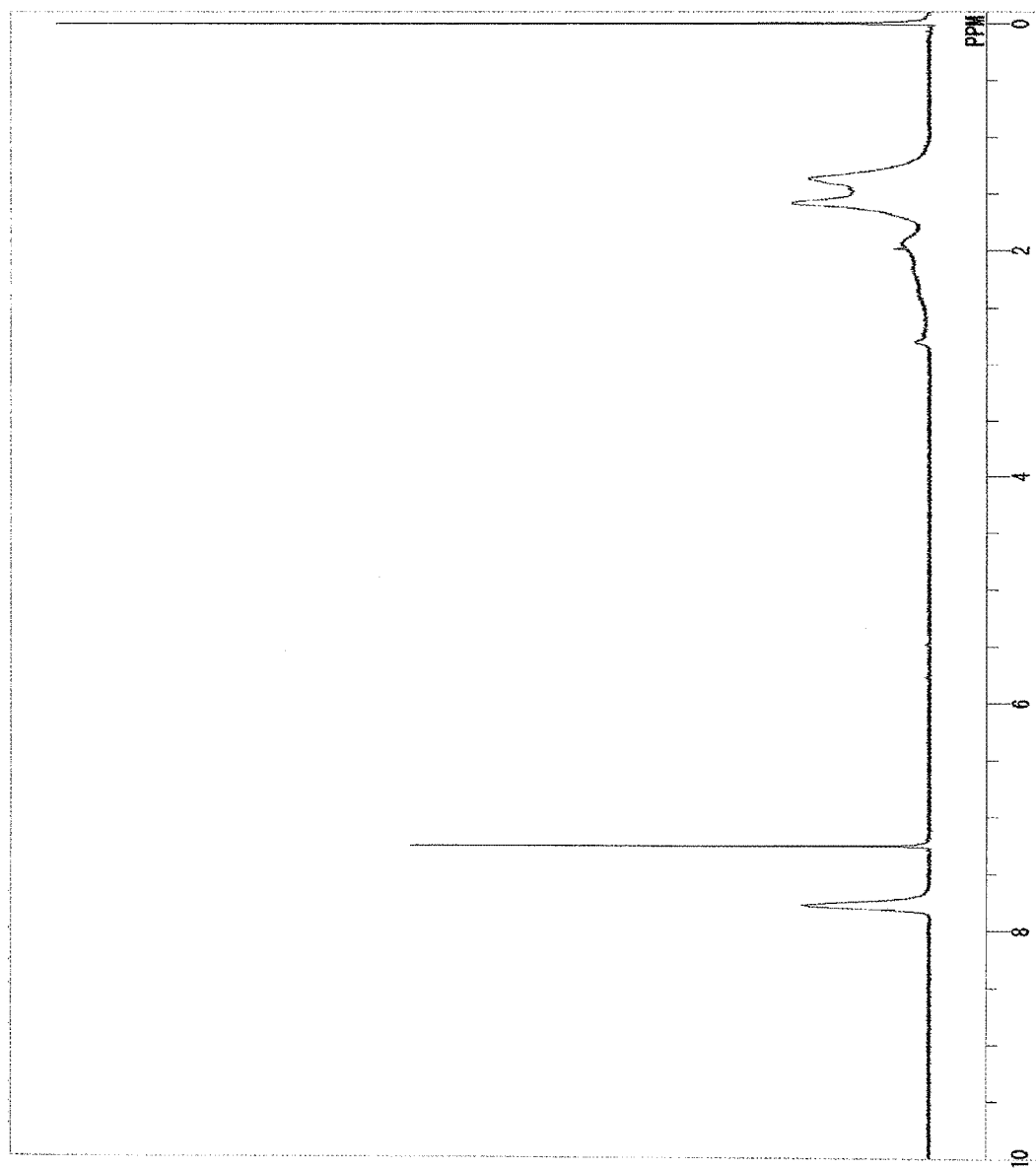
FIG. 18A is a $^1$H-NMR chart of a compound obtained in Example 9.

A reaction vessel was loaded with 234 mg (0.503 mmol) of N-(2,4,6-tribromophenyl)dimethacrylamide synthesized in Synthetic Example 1. To the vessel, 8.00 mg of azobisisobutyronitrile (AIBN) (manufactured by Wako Pure Chemical Industries, Ltd.) was added. The materials were dissolved by the addition of 0.5 mL of N-methyl-2-pyrrolidone (NMP). The vessel was purged with argon. Stirring was performed at 60° C. for 24 hours. The reaction solution was added to 40 mL of methanol, thus causing reprecipitation. The reaction vessel was washed with 1 mL of tetrahydrofuran (THF), and the washing liquid was added to the reprecipitation solvent. The resultant precipitate was suction filtered and vacuum dried while performing heating at 120° C. to give the target polymer as a white solid (51.8 mg, 22% of the theoretical weight). The theoretical bromine content was 51.4%. The glass transition temperature was 205° C., the 5% weight loss temperature 363° C., and the weight-average molecular weight 1,700 (Mw/Mn 1.5). The $^1$H-NMR of the target polymer is illustrated in FIG. 18A, the $^{13}$C-NMR in FIG. 18B, and the FT-IR chart in FIG. 19.

Figure 18B:
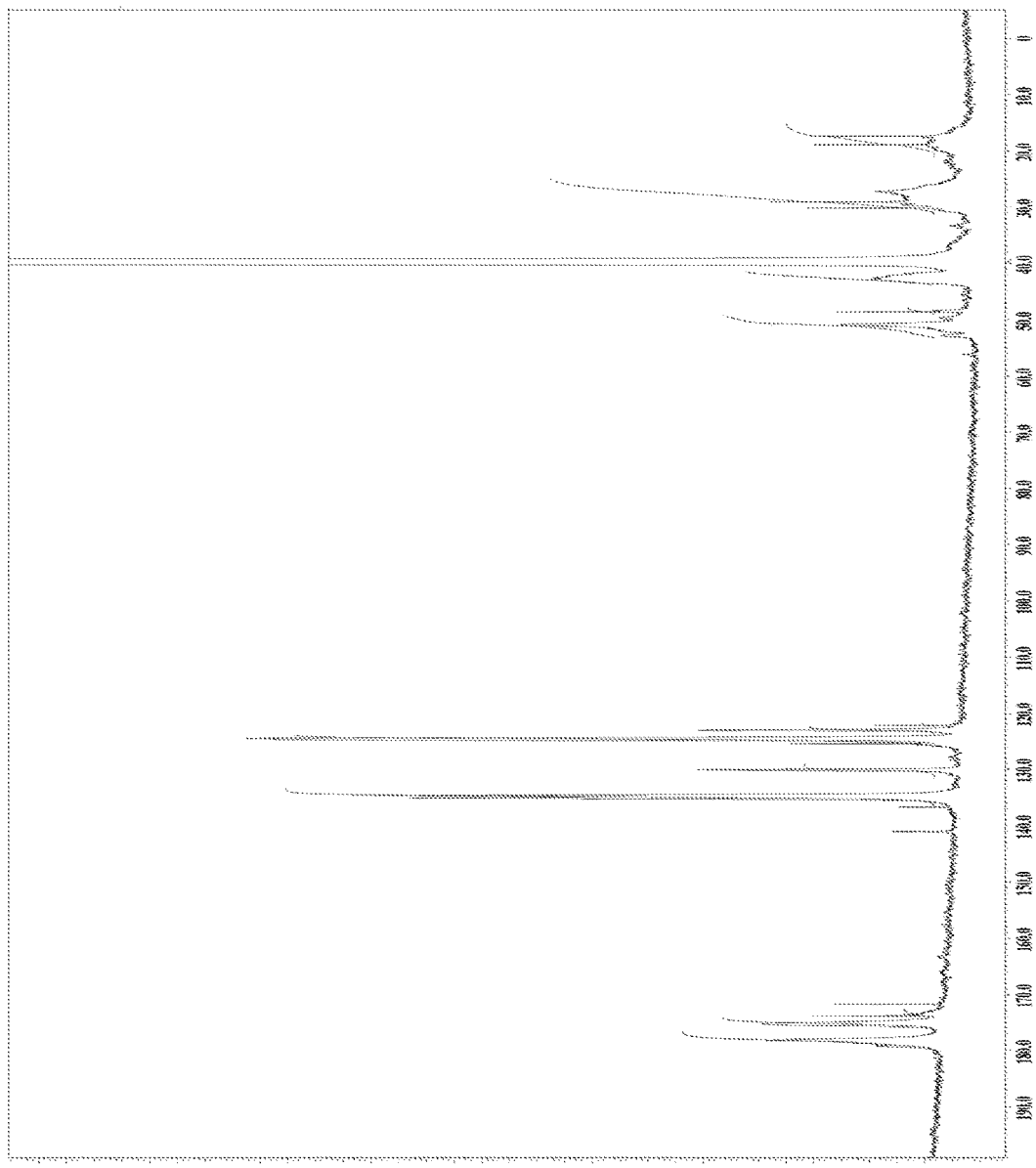
FIG. 18B is a $^{13}$C-NMR chart of the compound obtained in Example 9.
Figure 19:
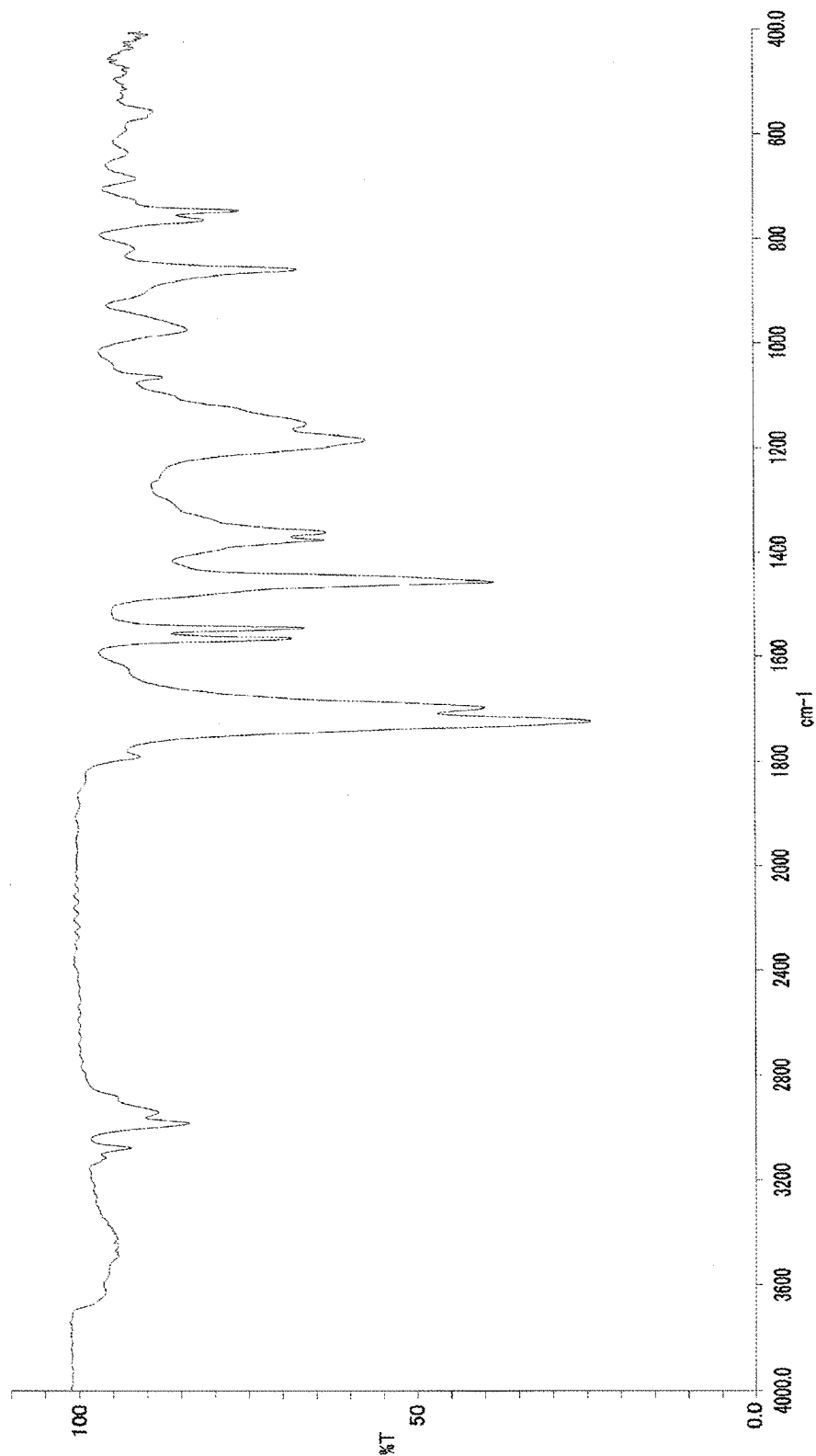
FIG. 19 is an FT-IR chart of the compound obtained in Example 9.

As illustrated in FIG. 19, the IR measurement showed two absorption peaks of imide's C=O (1722 cm$^{-1}$ and 1696 cm$^{-1}$). By comparison with the IR measurement results of Reference Examples 1 and 2, the former peak can be assigned to five-membered ring imide structures and the latter to six-membered ring imide structures. Thus, the polymer obtained in Example 9 includes both structural units of the general formula (2) and structural units of the general formula (3). Further, as illustrated in FIG. 18B, the $^{13}$C-NMR measurement showed two signals of imide's C=O (178 ppm and 175 ppm). By comparison with the $^{13}$C-NMR measurement results of Reference Examples 1 and 2, the former signal can be assigned to five-membered ring imide structures and the latter to six-membered ring imide structures. Based on the integral ratio of the two signals, the ratio of the structural units of the general formula (3) (five-membered rings) to the structural units of the general formula (2) (six-membered rings) was calculated to be 1.2:1.

Example 10

Radical polymerization of N-(2,4,6-tribromophenyl)dimethacrylamide

Figure 20:
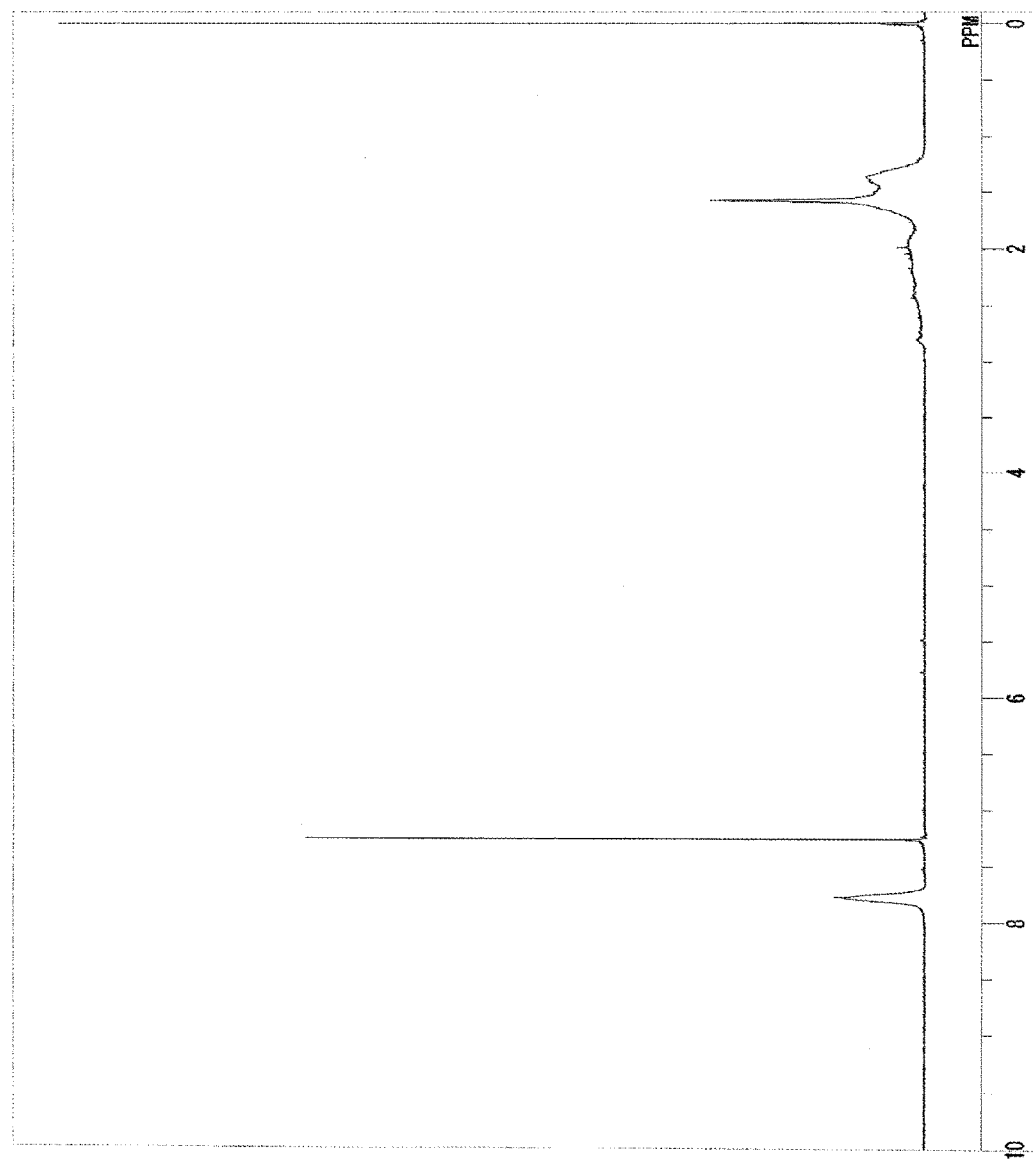
FIG. 20 is a $^1$H-NMR chart of a compound obtained in Example 10.
Figure 21:
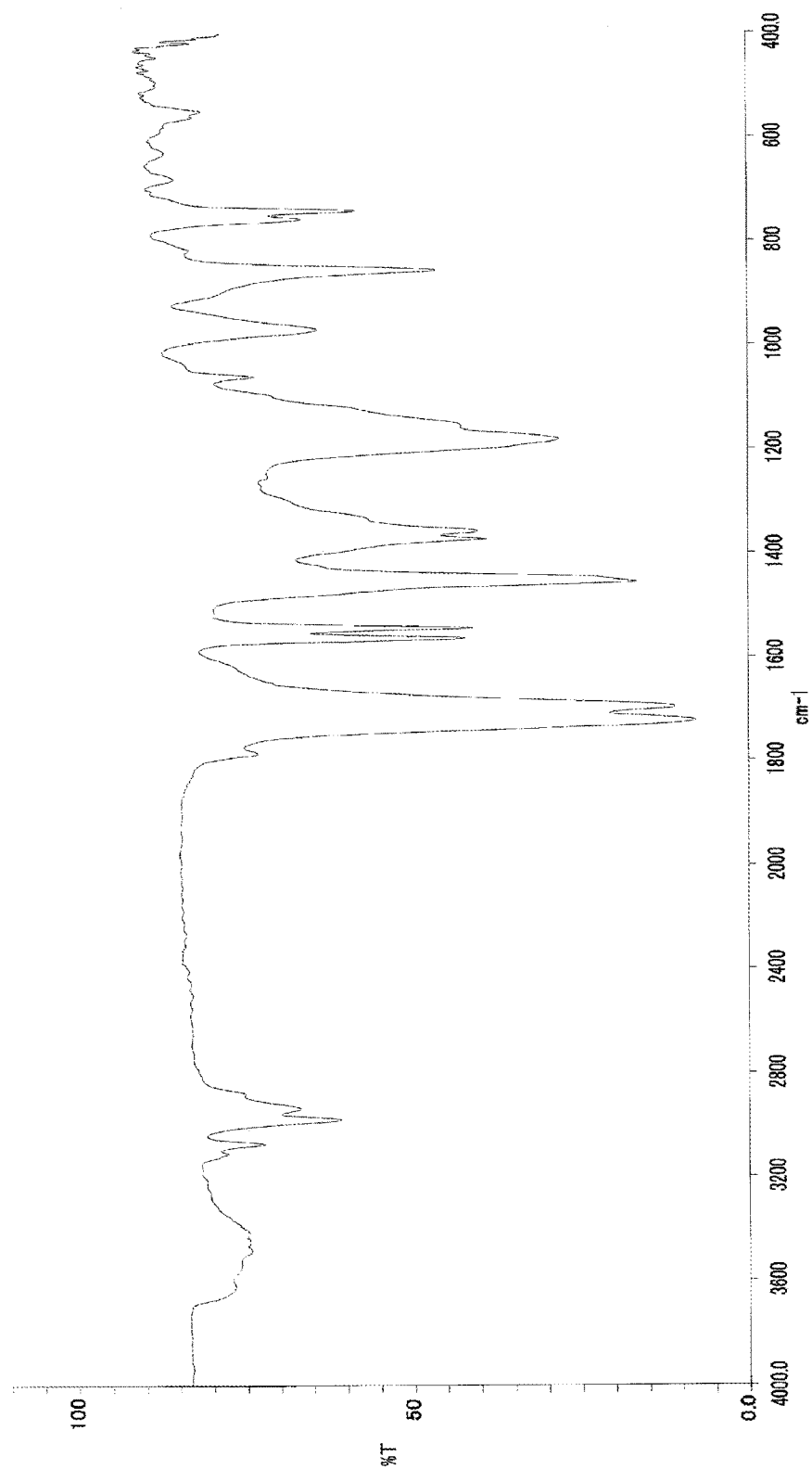
FIG. 21 is an FT-IR chart of the compound obtained in Example 10.

A reaction vessel was loaded with 467 mg (1.00 mmol) of N-(2,4,6-tribromophenyl)dimethacrylamide synthesized in Synthetic Example 1. To the vessel, 7.00 mg of di-t-butyl peroxide (manufactured by Wako Pure Chemical Industries, Ltd.) was added. The materials were dissolved by the addition of 1 mL of NMP. The vessel was purged with argon. Stirring was performed at 100° C. for 24 hours. The reaction solution was added to 40 mL of methanol, thus causing reprecipitation. The reaction vessel was washed with 1 mL of THF, and the washing liquid was added to the reprecipitation solvent. The resultant precipitate was suction filtered and vacuum dried while performing heating at 120° C. to give the target polymer as a white solid (196 mg, 42% of the theoretical weight). The theoretical bromine content was 51.4%. The glass transition temperature was 207° C., the 5% weight loss temperature 368° C., and the weight-average molecular weight 1,400 (Mw/Mn 1.4). The $^1$H-NMR of the target polymer is illustrated in FIG. 20, and the FT-IR chart in FIG. 21.

Example 11

Radical polymerization of N-(2,4,6-tribromophenyl)diacrylamide

Figure 22A:
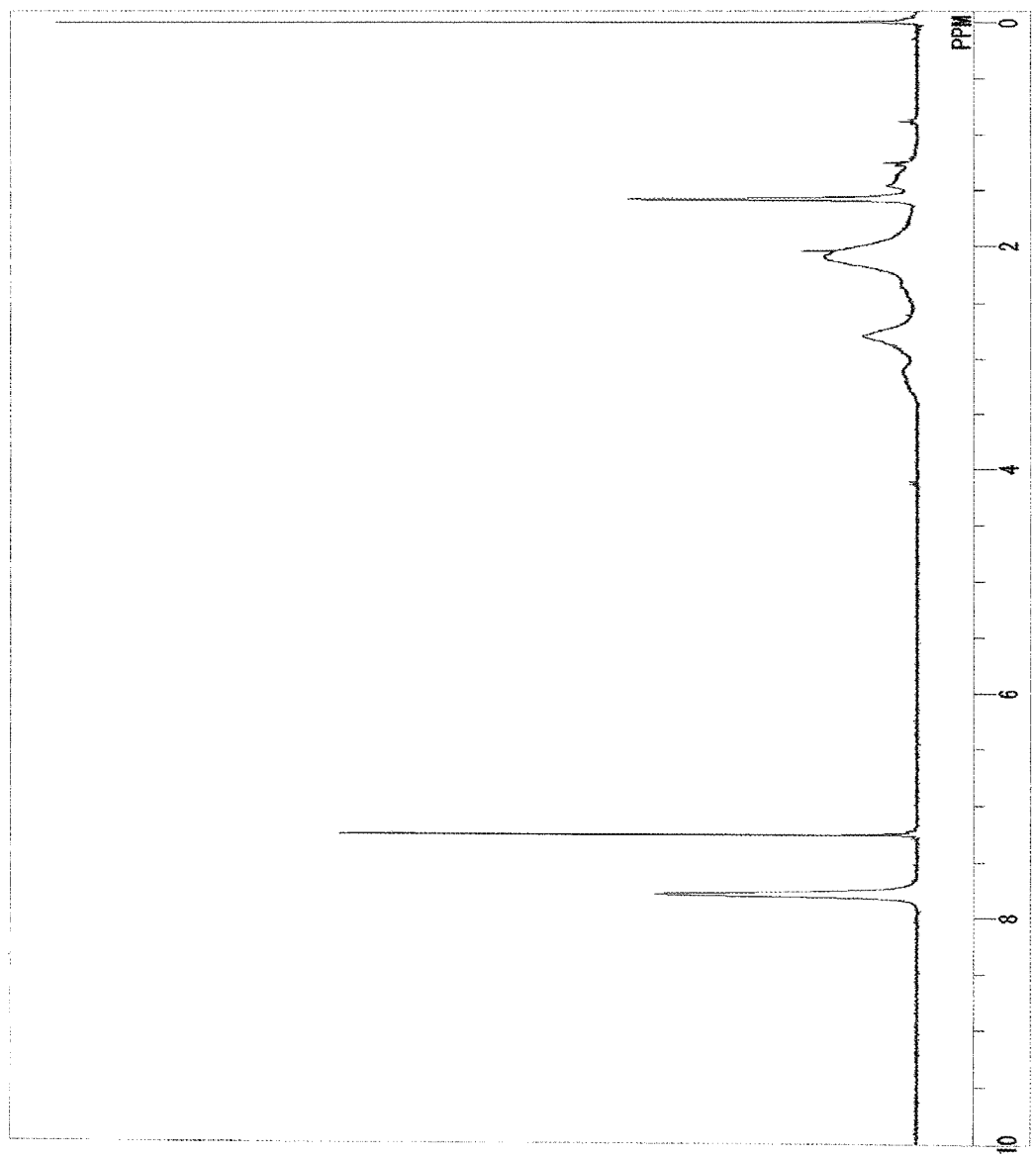
FIG. 22A is a $^1$H-NMR chart of a compound obtained in Example 11.

A reaction vessel was loaded with 219 mg (0.500 mmol) of N-(2,4,6-tribromophenyl)diacrylamide synthesized in Synthetic Example 3. To the vessel, 9.00 mg of AIBN (manufactured by Wako Pure Chemical Industries, Ltd.) and 1 mL of NMP were added. The vessel was purged with argon. Stirring was performed at 60° C. for 24 hours. The reaction solution was added to 40 mL of methanol, thus causing reprecipitation. The resultant precipitate was suction filtered and vacuum dried while performing heating at 120° C. to give the target polymer as a pale yellow solid (169 mg, 77% of the theoretical weight). The theoretical bromine content was 54.7%. The glass transition temperature was 200° C., the 5% weight loss temperature 346° C., and the weight-average molecular weight 5,200 (Mw/Mn 2.1). The $^1$H-NMR of the target polymer is illustrated in FIG. 22A, the $^{13}$C-NMR in FIG. 22B, and the FT-IR chart in FIG. 23.

Figure 22B:
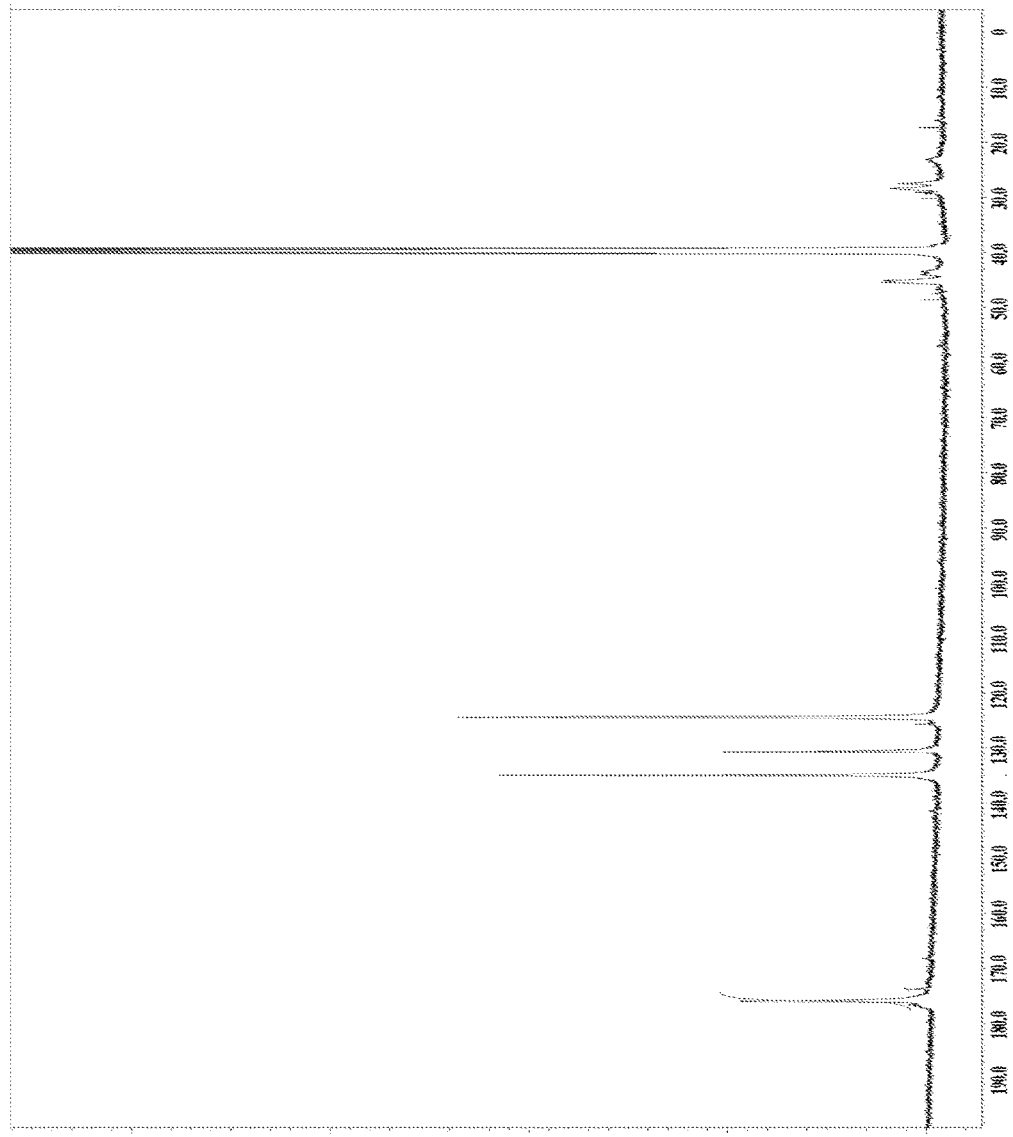
FIG. 22B is a $^{13}$C-NMR chart of the compound obtained in Example 11.
Figure 23:
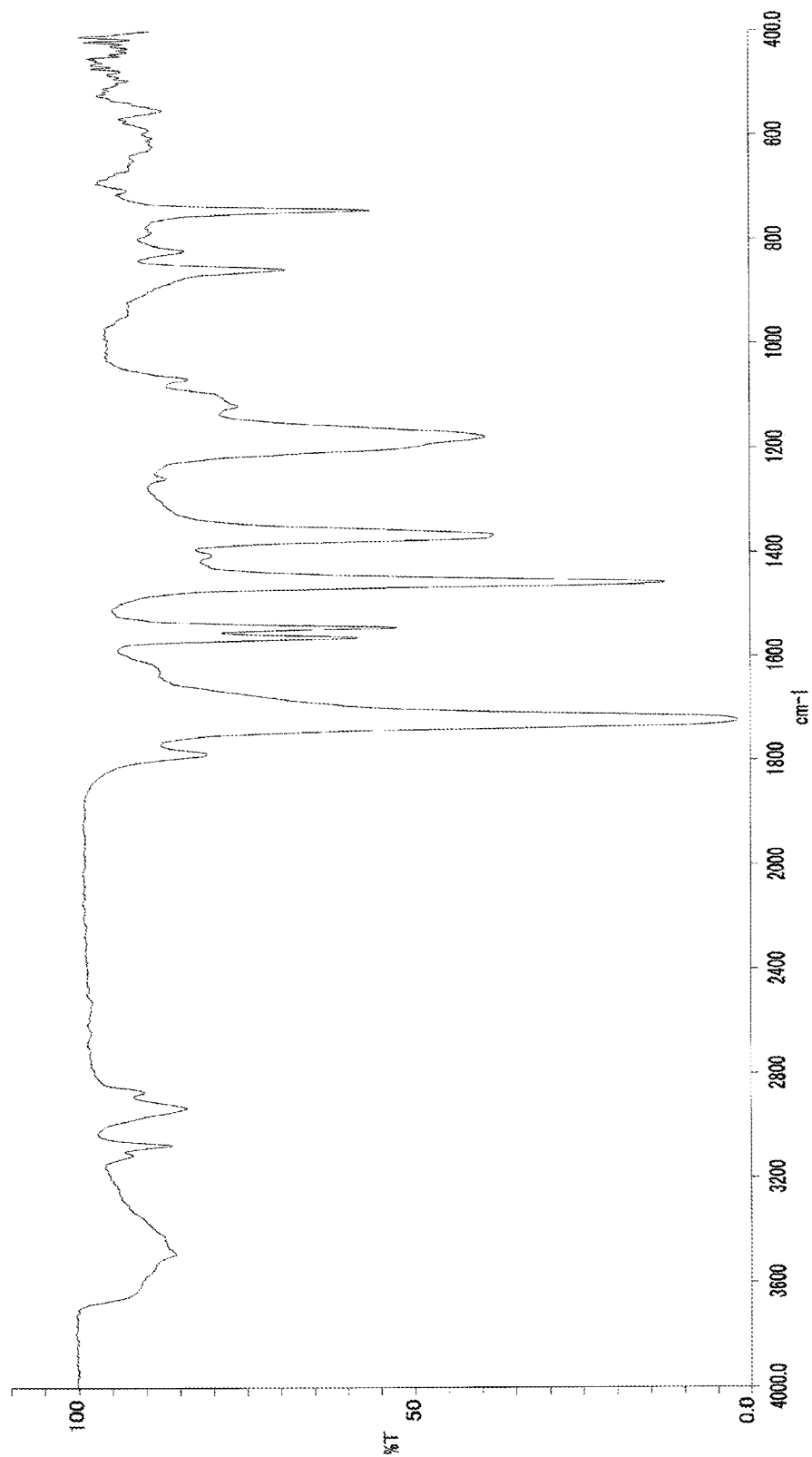
FIG. 23 is an FT-IR chart of the compound obtained in Example 11.

As illustrated in FIG. 23, the IR measurement showed one absorption peak of imide's C=O (1722 cm$^{-1}$). By comparison with the IR measurement results of Reference Example 1, the peak can be assigned to five-membered ring imide structures. Further, as illustrated in FIG. 22B, the $^{13}$C-NMR measurement showed one signal of imide's C=O (178 ppm). By comparison with the $^{13}$C-NMR measurement results of Reference Example 1, the signal can be assigned to five-membered ring imide structures. Based on these results, the polymer obtained in Example 11 is a compound consisting of structural units of the general formula (2).

Example 12

Copolymerization of N-(2,4,6-tribromophenyl)diacrylamide and styrene

Figure 24:
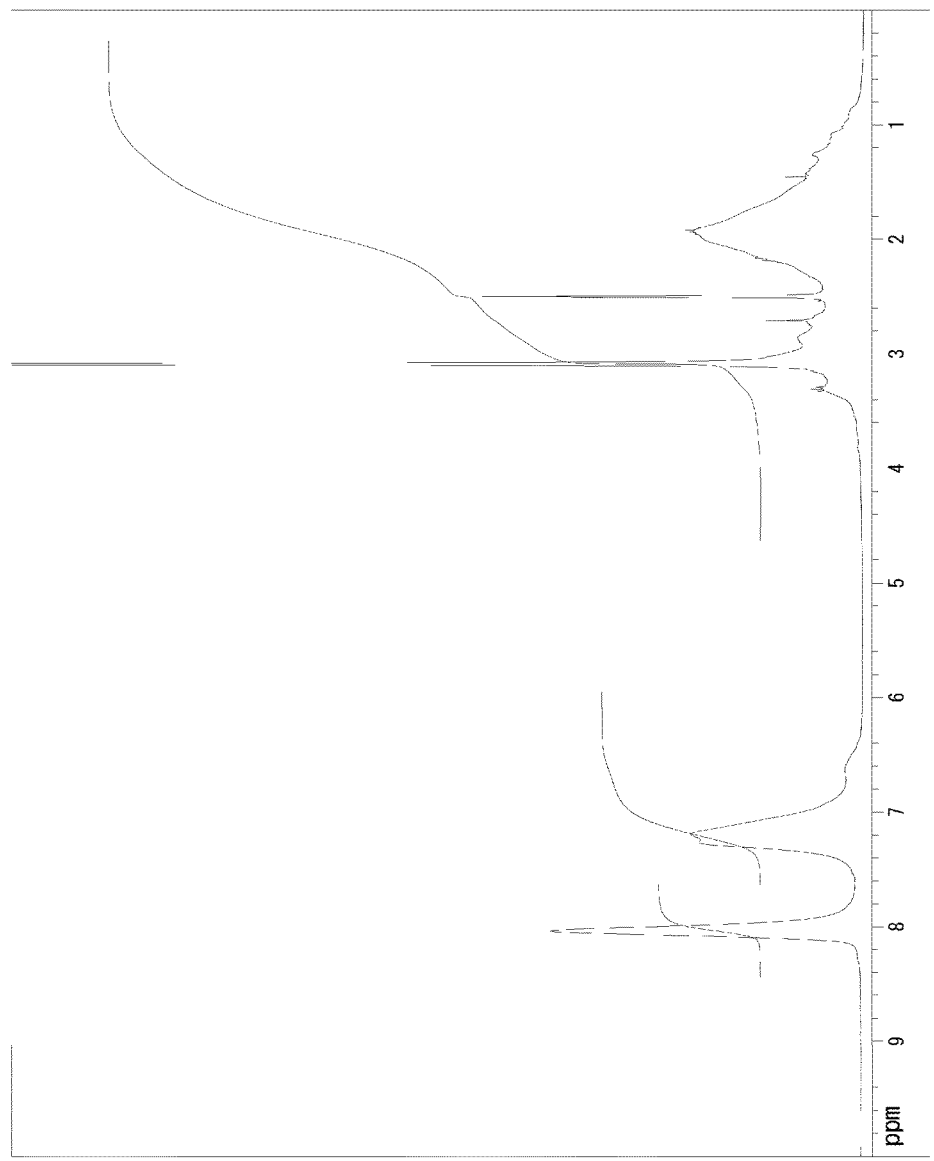
FIG. 24 is a $^1$H-NMR chart of a compound obtained in Example 12.
Figure 25:
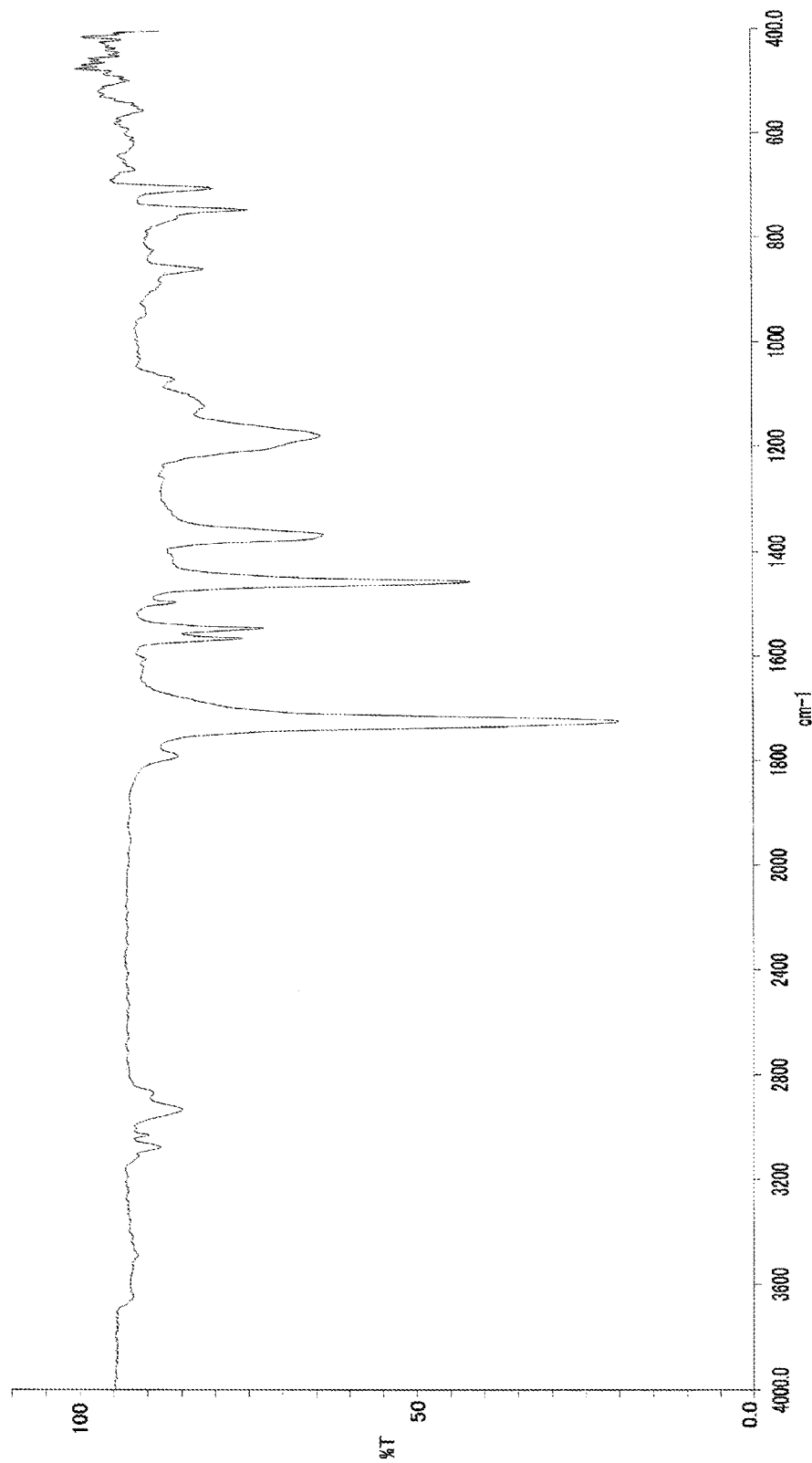
FIG. 25 is an FT-IR chart of the compound obtained in Example 12.

A reaction vessel was loaded with 217 mg (0.495 mmol) of N-(2,4,6-tribromophenyl)diacrylamide synthesized in Synthetic Example 3 and 50.8 mg (0.506 mmol) of styrene (manufactured by Wako Pure Chemical Industries, Ltd.). To the vessel, 8.00 mg of AIBN (manufactured by Wako Pure Chemical Industries, Ltd.) was added. The materials were dissolved by the addition of 0.75 mL of NMP. The vessel was purged with argon. Stirring was performed at 60° C. for 24 hours. After the completion of the reaction, the product was dissolved with 1 mL of THF and the solution was added to 30 mL of methanol, thus causing reprecipitation. The reaction vessel was washed with 1 mL of THF, and the washing liquid was added to the reprecipitation solvent. The resultant precipitate was suction filtered and vacuum dried while performing heating at 120° C. to give the target polymer as a white solid (232 mg, 86% of the theoretical weight). The bromine content was found to be 44.8%. The glass transition temperature was 195° C., the 5% weight loss temperature 337° C., and the weight-average molecular weight 126,600 (Mw/Mn 17.5). The $^1$H-NMR of the target polymer is illustrated in FIG. 24, and the FT-IR chart in FIG. 25. Based on $^1$H-NMR, the ratio of diacryloylamide monomer to styrene monomer was 2:1.

Example 13

Radical polymerization of N-(2,6-dibromo-4-methylphenyl)dimethacrylamide

Figure 26:
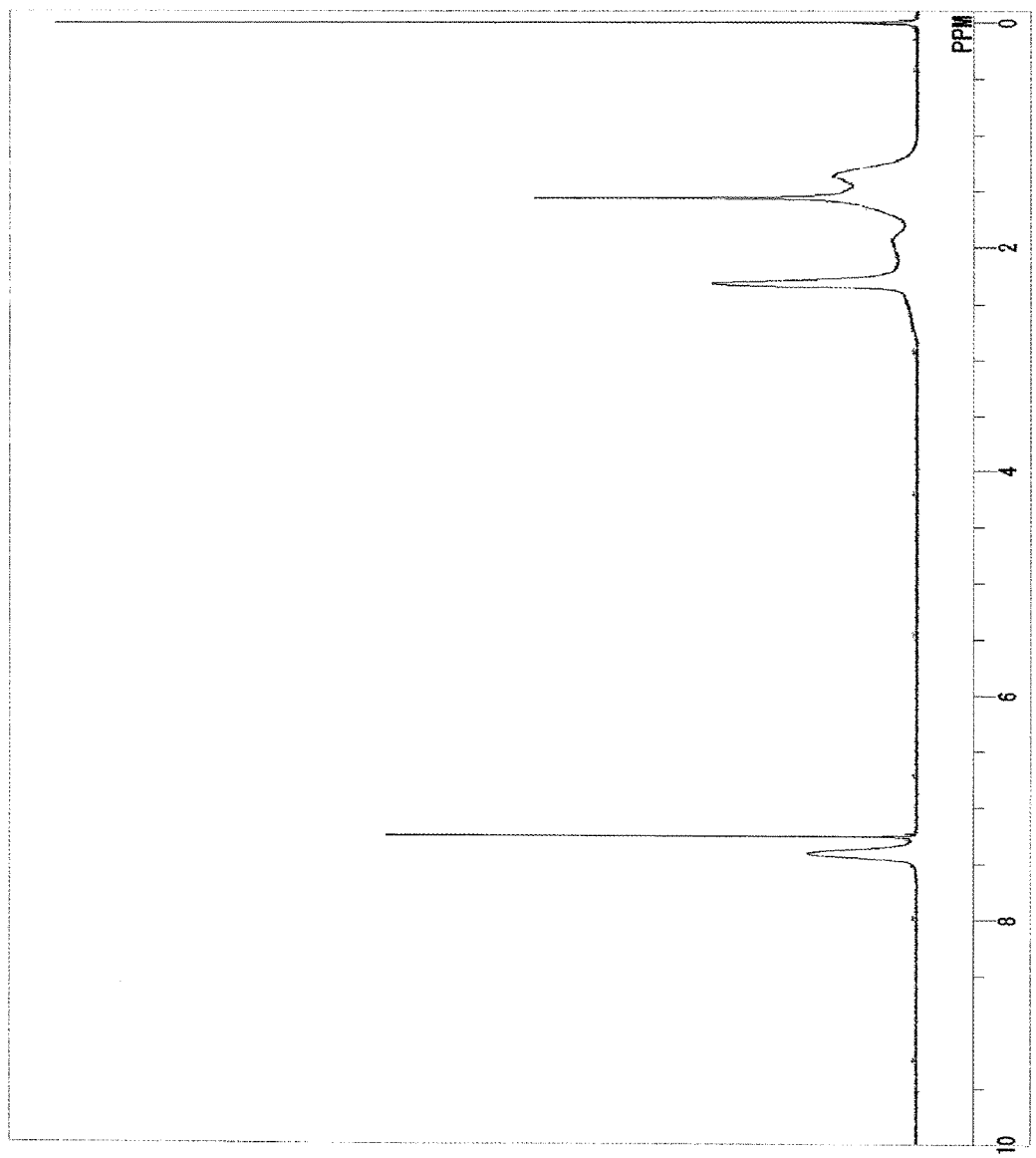
FIG. 26 is a $^1$H-NMR chart of a compound obtained in Example 13.
Figure 27:
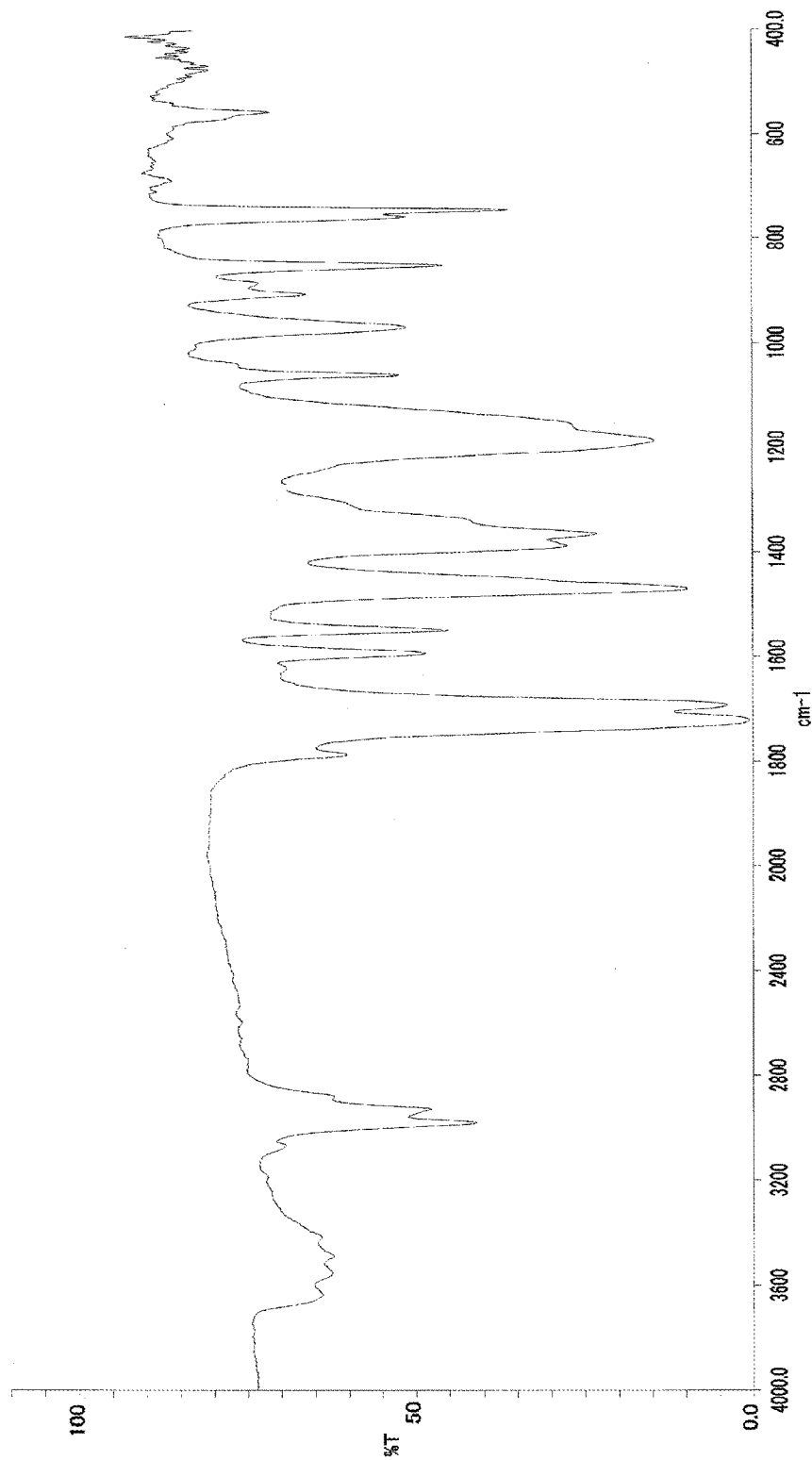
FIG. 27 is an FT-IR chart of the compound obtained in Example 13.

A reaction vessel was loaded with 201 mg (0.500 mmol) of N-(2,6-dibromo-4-methylphenyl)dimethacrylamide synthesized in Synthetic Example 4. To the vessel, 4.00 mg of di-t-butyl peroxide (manufactured by Wako Pure Chemical Industries, Ltd.) was added. The vessel was purged with argon. Stirring was performed at 140° C. for 24 hours. The resultant transparent solid was dissolved into 1 mL of THF and the solution was added to 40 mL of methanol, thus causing reprecipitation. The reaction vessel was washed with 1 mL of THF, and the washing liquid was added to the reprecipitation solvent. The resultant precipitate was suction filtered and vacuum dried while performing heating at 120° C. to give the target polymer as a white solid (152 mg, 76% of the theoretical weight). The theoretical bromine content was 39.8%. The glass transition temperature was 253° C., the 5% weight loss temperature 395° C., and the weight-average molecular weight 5,200 (Mw/Mn 2.4). The $^1$H-NMR of the target polymer is illustrated in FIG. 26, and the FT-IR chart in FIG. 27.

Example 14

Figure 28:
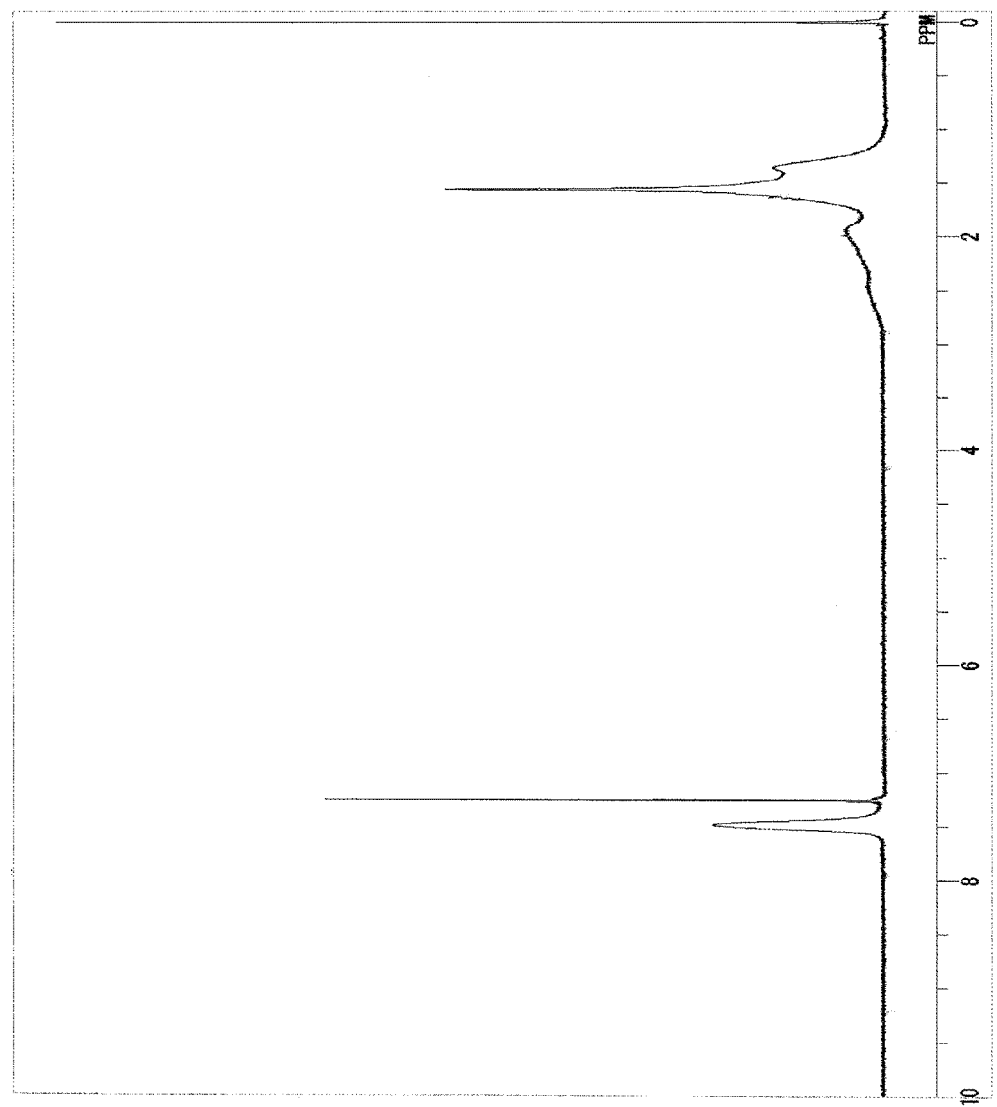
FIG. 28 is a $^1$H-NMR chart of a compound obtained in Example 14.
Figure 29:
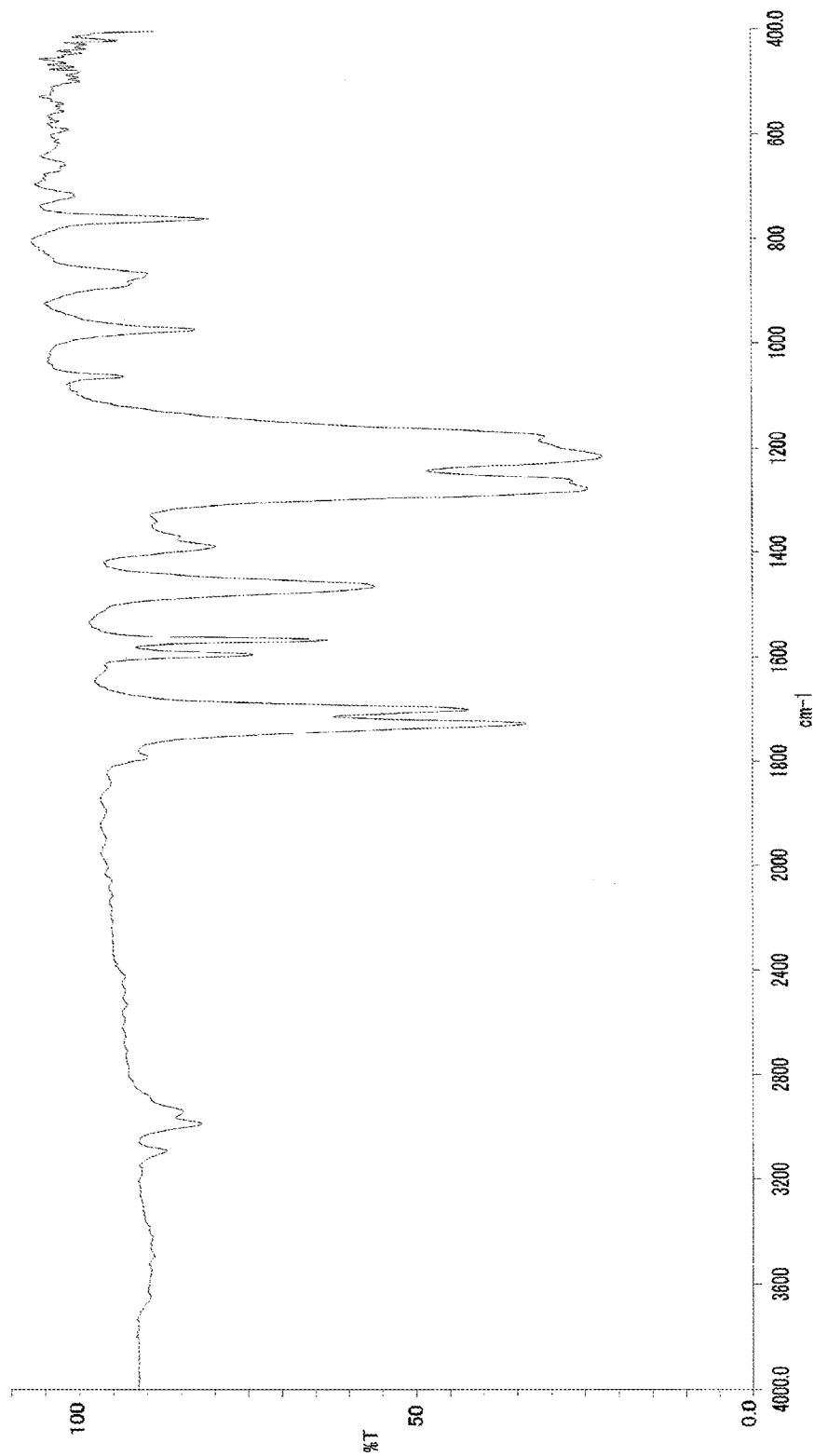
FIG. 29 is an FT-IR chart of the compound obtained in Example 14.

Radical polymerization of N-(2,6-dibromo-4-trifluoromethoxyphenyl)dimethacrylamide A reaction vessel was loaded with 235 mg (0.500 mmol) of N-(2,6-dibromo-4-trifluoromethoxyphenyl)dimethacrylamide synthesized in Synthetic Example 5. To the vessel, 4.00 mg of di-t-butyl peroxide (manufactured by Wako Pure Chemical Industries, Ltd.) was added. The vessel was purged with argon. Stirring was performed at 140° C. for 24 hours. The resultant transparent solid was dissolved into 1 mL of THF and the solution was added to 40 mL of methanol, thus causing reprecipitation. The reaction vessel was washed with 1 mL of THF, and the washing liquid was added to the reprecipitation solvent. The resultant precipitate was suction filtered and vacuum dried while performing heating at 120° C. to give the target polymer as a white solid (133 mg, 57% of the theoretical weight). The theoretical bromine content was 33.9%. The glass transition temperature was 215° C., the 5% weight loss temperature 375° C., and the weight-average molecular weight 11,200 (Mw/Mn 2.1). The $^1$H-NMR of the target polymer is illustrated in FIG. 28, and the FT-IR chart in FIG. 29.

Example 15

Radical polymerization of N-(2,6-dibromo-4-nitrophenyl)dimethacrylamide

Figure 30:
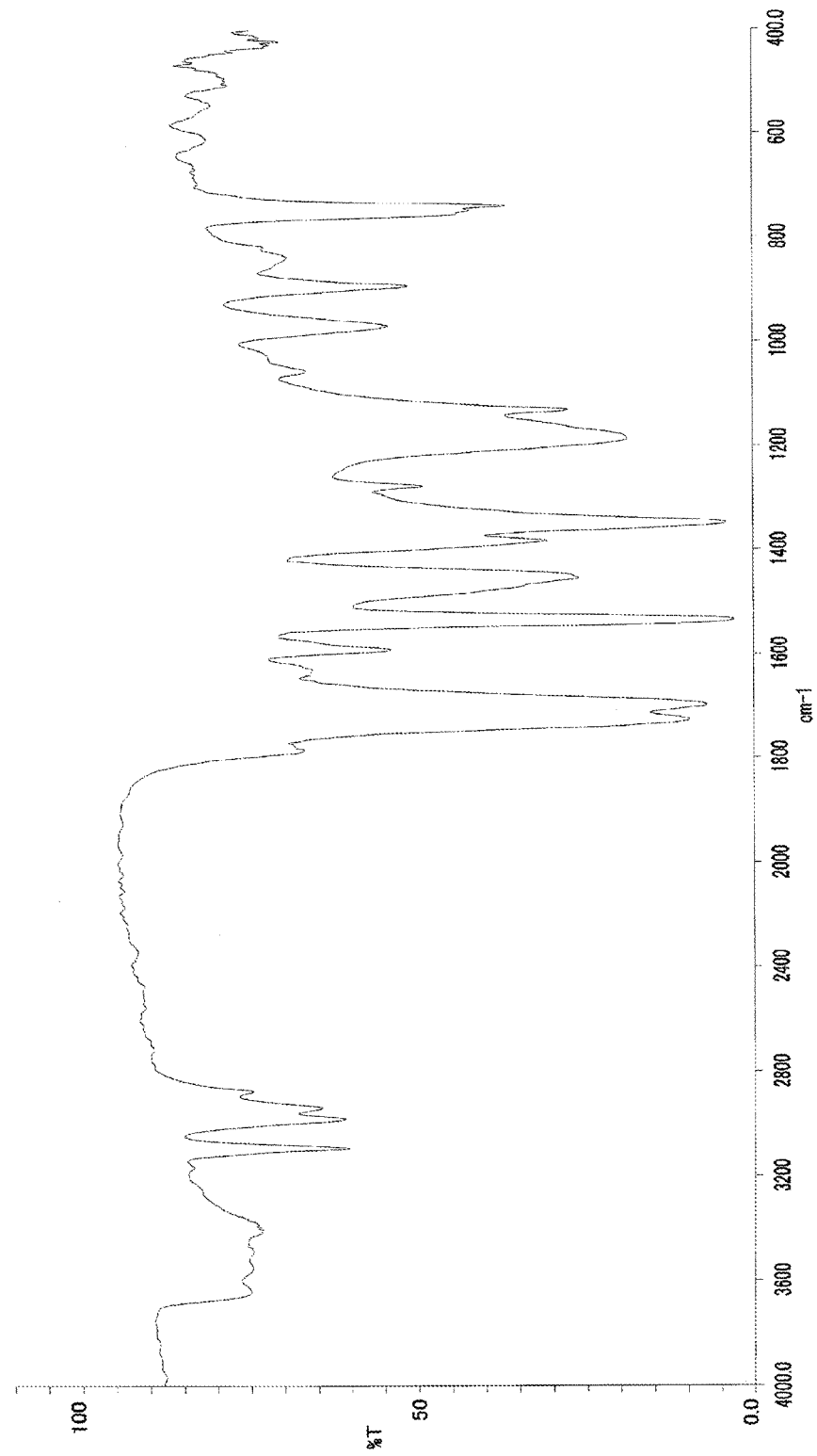
FIG. 30 is an FT-IR chart of a compound obtained in Example 15.

A reaction vessel was loaded with 216 mg (0.500 mmol) of N-(2,6-dibromo-4-nitrophenyl)dimethacrylamide synthesized in Synthetic Example 6. To the vessel, 4.00 mg of di-t-butyl peroxide (manufactured by Wako Pure Chemical Industries, Ltd.) was added. The vessel was purged with argon. Stirring was performed at 140° C. for 24 hours. The resultant transparent solid was dissolved into 1 mL of THF and the solution was added to 40 mL of methanol, thus causing reprecipitation. The reaction vessel was washed with 1 mL of THF, and the washing liquid was added to the reprecipitation solvent. The resultant precipitate was suction filtered and vacuum dried while performing heating at 120° C. to give the target polymer as a white solid (45.5 mg, 21% of the theoretical weight). The theoretical bromine content was 37.0%. The glass transition temperature was not detected, the 5% weight loss temperature was 303° C., and the weight-average molecular weight was 8,100 (Mw/Mn 3.3). The FT-IR chart of the target polymer is illustrated in FIG. 30.

INDUSTRIAL APPLICABILITY

The polymers of the present invention contain bromine atoms in the monomer units and have ring structures in the main chain. By virtue of such configurations, the bromine-containing polymers are useful as flame retardants or flame-retardant resins having outstanding heat resistance. Further, the polymers of the invention, by virtue of their containing bromine atoms, can be expected to be used also as flame-retardant resin materials having excellent optical characteristics (in particular, a high refractive index).

The invention claimed is:

1. A polymer comprising structural units of the following general formula (2):

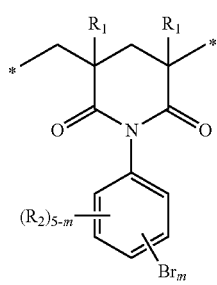

(2)

wherein m is an integer of 2 to 5, $R_1$ may be the same as or different from one another and represents at each occurrence a hydrogen atom or an alkyl group having 1 to 4 carbon atoms, $R_2$ is a hydrogen atom, a fluorine atom, a chlorine atom, an iodine atom, an alkyl group having 1 to 4 carbon atoms, an alkoxy group having 1 to 4 carbon atoms, an alkylthio group having 1 to 4 carbon atoms, a haloalkyl group having 1 to 4 carbon atoms, a haloalkoxy group having 1 to 4 carbon atoms, a vinyl group, a nitro group, a cyano group, a formyl group, an amino group, a hydroxyl group, a thiol group, a sulfo group, a sulfonamide group, a carboxyl group or an ester group, and, when m is 2 or 3, $R_2$ may be the same as or different from one another, and the asterisks indicate a polymer end or a bond to other structural unit.

2. The polymer according to claim 1, further comprising structural units of the following general formula (3):

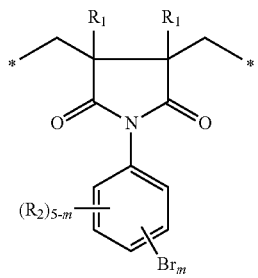

(3)

wherein m is an integer of 2 to 5, $R_1$ may be the same as or different from one another and represents at each occurrence a hydrogen atom or an alkyl group having 1 to 4 carbon atoms, $R_2$ is a hydrogen atom, a fluorine atom, a chlorine atom, an iodine atom, an alkyl group having 1 to 4 carbon atoms, an alkoxy group having 1 to 4 carbon atoms, an alkylthio group having 1 to 4 carbon atoms, a haloalkyl group having 1 to 4 carbon atoms, a haloalkoxy group having 1 to 4 carbon atoms, a vinyl group, a nitro group, a cyano group, a formyl group, an amino group, a hydroxyl group, a thiol group, a sulfo group, a sulfonamide group, a carboxyl group or an ester group, and, when in is 2 or 3, $R_2$ may be the same as or different from one another, and the asterisks indicate a polymer end or a bond to other structural unit.

3. The polymer according to claim 1, wherein $R_2$ is a hydrogen atom.

4. The polymer according to claim 1, wherein $R_1$ is a hydrogen atom or a methyl group.

5. The polymer according to claim 1, wherein the bromine content is 10 wt % to 75 wt % relative to the total weight of the polymer.

6. The polymer according to claim 1, which consists solely of the structural units of the general formula (2).

7. A flame retardant comprising the polymer according to claim 1.

8. A flame-retardant optical material comprising the polymer according to claim 1.

9. A method for producing a polymer comprising a step of polymerizing a monomer of the following general formula (4):

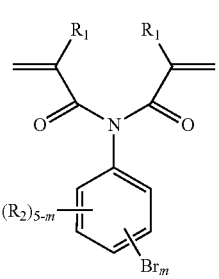

(4)

wherein m is an integer of 2 to 5, $R_1$ may be the same as or different from one another and represents at each occurrence a hydrogen atom or an alkyl group having 1 to 4 carbon atoms, $R_2$ is a hydrogen atom, a fluorine atom, a chlorine atom, an iodine atom, an alkyl group having 1 to 4 carbon atoms, an alkoxy group having 1 to 4 carbon atoms, an alkylthio group having 1 to 4 carbon atoms, a haloalkyl group having 1 to 4 carbon atoms, a haloalkoxy group having 1 to 4 carbon atoms, a vinyl group, a nitro group, a cyano group, a formyl group, an amino group, a hydroxyl group, a thiol group, a sulfo group, a sulfonamide group, a carboxyl group or an ester group, and when m is 2 or 3, $R_2$ may be the same as or different from one another;

the polymer including structural units of the following general formula (2):

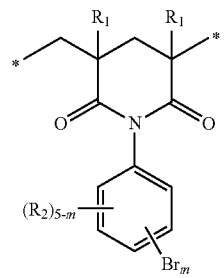

(2)

wherein $R_1$, $R_2$, m and the asterisks are the same as defined in claim 1.

10. The production method according to claim 9, wherein the polymerization step is performed in the presence of a radical polymerization initiator.

11. The production method according to claim 10, wherein the radical polymerization initiator is an organic peroxide, an organic azo compound or a mixture of these compounds.

12. The polymer according to claim 2, consisting of the structural units of the general formula (2) and structural units of the general formula (3).

* * * * *